US007090130B2

(12) United States Patent
DeLand, Jr. et al.

(10) Patent No.: US 7,090,130 B2
(45) Date of Patent: Aug. 15, 2006

(54) METHOD AND APPARATUS FOR GENERATING IMAGES OF MAGNETIC FIELDS IN AT LEAST TWO DIMENSIONS

(75) Inventors: Robert S. DeLand, Jr., Torrance, CA (US); Stephen R. Wood, San Pedro, CA (US)

(73) Assignee: Mag-Tek, Inc., Carson, CA (US)

( * ) Notice: Subject to any disclaimer, the term of this patent is extended or adjusted under 35 U.S.C. 154(b) by 0 days.

(21) Appl. No.: 10/268,131

(22) Filed: Oct. 9, 2002

(65) Prior Publication Data

US 2003/0085277 A1 May 8, 2003

Related U.S. Application Data

(60) Provisional application No. 60/349,930, filed on Jan. 18, 2002, provisional application No. 60/328,286, filed on Oct. 9, 2001.

(51) Int. Cl.
*G06K 7/08* (2006.01)

(52) U.S. Cl. ...................... 235/449; 235/450; 235/493

(58) Field of Classification Search ................ 235/449, 235/450, 493
See application file for complete search history.

(56) References Cited

U.S. PATENT DOCUMENTS

| | | | | |
|---|---|---|---|---|
| 3,978,450 | A * | 8/1976 | Sanner et al. | 382/320 |
| 4,058,706 | A * | 11/1977 | Kao et al. | 235/449 |
| 4,811,408 | A | 3/1989 | Goldman | |
| 5,508,856 | A | 4/1996 | Fujimoto | |
| 5,714,747 | A | 2/1998 | West et al. | |
| 6,042,014 | A | 3/2000 | Zanetti | |
| 6,445,808 | B1 * | 9/2002 | Lile et al. | 382/101 |

OTHER PUBLICATIONS

International Search Report for PCT/US02/32485, application filed Oct. 9, 2002, date of mailing of International Search Report: Mar. 3, 2003 (3 pages).

* cited by examiner

*Primary Examiner*—Karl D. Frech
(74) *Attorney, Agent, or Firm*—Christie, Parker & Hale, LLP

(57) ABSTRACT

Apparatus and Methods for imaging magnetic fields and for using images of magnetic fields in the authentication of magnetic stripe cards or documents are disclosed. The systems described provide an increased tolerance for misalignments of magnetic reading heads. One preferred embodiment of the invention includes sensing circuitry for sensing an image of the magnetic field using an array of magnetic reading heads and sampling circuitry connected to the sensing circuitry.

15 Claims, 24 Drawing Sheets

2118
2110
1900
2106
2116
2112
Logic Circuitry
Sample & Hold
1906
Peak Detector
1908
2102
2104
2108
Amplifier
304"
2000
200"
2006
2004
Current Source
MUX
202"
2002

104"
2204
Sample Buffer
308"
309"
1908
Sampling Control Circuitry
1902
1904
A/D Converter
306"
102"
302"
MUX
1900
2118
1906
Sample & Hold
Sample & Hold
Sample & Hold
2102

METHOD AND APPARATUS FOR GENERATING IMAGES OF MAGNETIC FIELDS IN AT LEAST TWO DIMENSIONS

CROSS-REFERENCE TO RELATED APPLICATION

This application claims priority to U.S. provisional application No. 60/328,286 filed on Oct. 9, 2001 and U.S. provisional application No. 60/349,930 filed on Jan. 18, 2002, the contents of which are incorporated herein by reference.

BACKGROUND OF THE INVENTION

The invention relates generally to the imaging of magnetic fields and more specifically to methods and apparatus for generating images of magnetic fields and for extracting information from images of magnetic fields.

The storage of data in magnetic media such as magnetic tapes, magnetic disks and magnetic stripes has become ubiquitous. One common application involving the storage of digital data in a magnetic medium is the storage of information on magnetic stripe cards. Magnetic stripe cards are commonly used in financial transactions and as a form of identification in conjunction with security systems.

The creation of duplicate magnetic stripe cards is a considerable security concern in magnetic stripe card applications. A duplicate magnetic stripe card that contains the same digital information as an original magnetic stripe card cannot be distinguished from the original on the basis of the digital data stored in the magnetic stripe alone.

U.S. Pat. No. 6,098,881 to DeLand, Jr. et al. describes a system for distinguishing between an original magnetic stripe card and duplicates of the original by using the underlying magnetic characteristics of the materials used in the construction of magnetic stripe cards. The underlying characteristics of the magnetic stripe are virtually impossible to reproduce and measuring these characteristics provides a way of determining whether a magnetic stripe card is an original or a duplicate. U.S. Pat. No. 6,098,881 to DeLand, Jr. et al. is hereby incorporated by reference in its entirety into the present disclosure.

The system described by DeLand, Jr. et al. verifies the characteristics of the magnetic stripe by taking a number of samples using a single fixed magnetic reading head. These samples are then used to generate a one dimensional array of data. The system compares the array of data to a reference array and uses the correlation between the two arrays to determine whether the card being read is an original.

The contents of the array of data for a given magnetic stripe can vary depending on the alignment of the magnetic head that is used to generate the array. Therefore, the correlation between the data array and the reference array required to make a determination that the card being read is an original must be lower in systems that tolerate substantial magnetic reading head misalignment. The lower the required correlation the less ability the authentication system has for distinguishing original magnetic stripe cards from duplicates.

SUMMARY OF THE INVENTION

The present invention provides methods and apparatus for generating images of magnetic fields and for verifying the authenticity of documents using magnetic fingerprints. The invention enables the generation of images of magnetic fields that are corrected to account for magnetic reading head misalignment. The invention also provides the ability to authenticate magnetic stripe cards using features of the magnetic field that typically are not observable using a single fixed magnetic reading head.

In one embodiment the invention includes sensing circuitry for sensing an image of the magnetic field using an array of magnetic reading heads and sampling circuitry connected to the sensing circuitry.

In another embodiment, the array of magnetic reading heads is a staggered array of magnetic reading heads, the signal processing circuitry includes a microprocessor connected to memory and the sampling circuitry includes an analog-to-digital converter.

A further embodiment includes sensing circuitry that generates a first signal indicative of the intensity of a portion of the magnetic field, sampling circuitry connected to the sensing circuitry that measures the first signal and generates a second signal indicative of the measurement of the first signal and signal processing circuitry connected to the sampling circuitry that uses the second signal to construct an image of the magnetic field.

In a further embodiment again, the sensing circuitry comprises an array of magnetic reading heads, each magnetic reading head in the array of magnetic reading heads is positioned over a separate portion of the magnetic field, each magnetic reading head in the array of magnetic reading heads generates a separate signal indicative of the intensity of the portion of the magnetic field over which the magnetic reading head is positioned and the sampling circuitry measures each of the signals generated by the sensing circuitry and generates a separate signal indicative of each measurement.

An alternative embodiment of the invention includes positioning a magnetic reading head over a first portion of the magnetic field, generating a measurement indicative of the intensity of the portion of the magnetic field over which the magnetic reading head is positioned, repositioning the magnetic reading head over a second portion of the magnetic field and repeatedly measuring the field until every portion of the magnetic field has been measured and generating an image of the magnetic field using the measurements.

Another alternative embodiment includes positioning an array of magnetic reading heads over a first portion of the magnetic field, sampling each of the magnetic reading heads in the array of magnetic reading heads, repositioning the magnetic reading head over a second portion of the magnetic field and repeatedly measuring the magnetic field until every portion of the magnetic field has been measured and generating an image of the magnetic field using the measurements.

In another further embodiment generating an image of the magnetic field using the measurements includes correcting any offsets introduced by staggering of the magnetic reading heads in the array of magnetic reading heads, sequential sampling and/or motion of the array of magnetic reading heads during sampling and correcting any azimuth misalignment of the array of magnetic reading heads. In addition, correcting any offsets introduced by staggering of the magnetic reading heads in the array of magnetic reading heads, sequential sampling and/or motion of the array of magnetic reading heads during sampling includes generating a new image using a weighted average to correct the offsets.

Another aspect of the invention includes sensing circuitry for sensing an image of at least a portion of the magnetic field using an array of magnetic reading heads, sampling circuitry connected to the sensing circuitry and signal processing circuitry connected to the sampling circuitry.

In still further embodiment again, the magnetic reading heads in the array of magnetic reading heads are rectangular with an upper longitudinal edge and a lower longitudinal edge and the magnetic reading heads in the array of magnetic reading heads are staggered so that the upper longitudinal edge of a first magnetic reading head is aligned with the lower longitudinal edge of a second magnetic reading head.

A further aspect of the invention includes a magnetic stripe card having a magnetic field with known characteristics, sensing circuitry that generates a first signal indicative of the intensity of a portion of the magnetic field, sampling circuitry connected to the sensing circuitry that measures the first signal and generates a second signal indicative of the measurement of the first signal and signal processing circuitry connected to the sampling circuitry that uses the second signal to construct an image of the magnetic field in at least two dimensions.

In a still further alternative embodiment of the invention, the signal processing circuitry is able to substantially identify the known characteristic features of the magnetic field and the signal processing circuitry uses the known characteristic features to correct for misalignments of the sensing circuitry. In addition, the system is adaptable to identify the authenticity of the magnetic stripe card based on a first portion of the magnetic stripe card having a first lateral height and the sensing circuitry includes an array of magnetic reading heads that has a lateral height greater than the first lateral height.

Yet another embodiment of the invention includes generating a reference image in at least two dimensions of at least a first portion of the magnetic field, where the first portion is in a specific location relative to the known characteristic features of the magnetic field, generating a comparison image in at least two dimensions of a second portion of the magnetic field that includes the first portion of the magnetic field, selecting a portion of the reference image corresponding to the first portion of the magnetic field, selecting a portion of the comparison image corresponding to the first portion of the magnetic field and comparing the portion of the comparison image to the reference image.

In still yet another embodiment, selecting of a portion of the comparison image corresponding to the first portion of the magnetic field includes locating known characteristic features within the magnetic field of the second portion of the magnetic field, adjusting the image to correct for azimuth misalignment and determining the location of the portion of the comparison image using the known location of the first portion of the magnetic field relative to the locations of the known characteristic features of the magnetic field.

In still yet another further embodiment, comparing a portion of the comparison image to the portion of the reference image includes extracting one or more columns from the reference image, extracting columns substantially corresponding to the columns extracted from the reference image, summing the extracted columns and comparing the correlation of the sums of the extracted columns from the reference image to the sums of the extracted columns from the comparison image.

In still yet another alternative embodiment, comparing the portion of the comparison image the portion of the reference image includes locating a lateral ridge of a predetermined magnetic intensity peak in the portion of the comparison image and the portion of the reference image, locating predetermined 'mixels' within the lateral ridges and comparing the located 'mixels' from the reference image with the located 'mixels' from the comparison image.

In still yet another further embodiment again, comparing the located 'mixels' from the reference image with the located 'mixels' from the comparison image, includes determining the correlation between the located 'mixels' from the reference image with the located 'mixels' from the comparison image.

Another aspect of the invention again includes a magnetic medium containing data encoded using magnetic flux transitions and wherein the fingerprint includes the magnetic field in a region of the magnetic medium that contains a portion of one of the magnetic flux transitions.

In still yet another alternative embodiment again, the region of the magnetic medium contains an entire magnetic flux transition, the fingerprint includes the magnetic field in a plurality of regions of the magnetic medium and each region contains a portion of a magnetic flux transition. Alternatively, each portion is from the same magnetic flux transition.

A still further aspect of the invention includes a magnetic reading head array including a plurality of magnetic reading heads and a sample and hold circuit connected to an output of at least one of the magnetic reading heads. Another aspect of the invention may be that the sample and hold circuit is configured to detect peaks in the output of a magnetic reading head and to sample the peak output once a peak is detected.

In still another further aspect of the invention the sample and hold circuitry is amplitude qualified and also includes an analog to digital converter connected to an output of the sample and hold circuit and the magnetic reading head is configured to generate an analog signal as an output, the sample and hold circuitry is configured to generate an analog signal as an output and the analog to digital converter is configured to take an analog signal as an input and provide a digital signal as an output.

In yet another further aspect of the invention, the analog to digital converter is connected to the output of the sample and hold circuit via a multiplexer, the sampling control circuitry is connected to the magnetic reading head array, the sample and hold circuitry, the multiplexer and the analog to digital converter and the sampling control circuitry is configured to co-ordinate the activities of the magnetic reading head array, the sample and hold circuitry, the multiplexer and the analog to digital converter.

Yet another further aspect of the invention again includes a magnetic reading head array including a plurality of magnetic reading heads, a sample and hold circuit connected to an output of at least one of the magnetic reading heads and an analog to digital converter connected to an output of the sample and hold circuit. In addition, the sample and hold circuit is configured to detect peaks in the output of a magnetic reading head and to sample the peak output once a peak is detected and the analog to digital converter is configured to provide a digital signal indicative of the sampled peak output.

Still yet another further aspect of the invention includes means for imaging a magnetic field, means for sampling the output of the imaging means and means for converting the samples into data capable of manipulation by a microprocessor.

Still yet another alternative aspect of the invention includes detecting a peak in the output of any of the magnetic reading heads, recording the value of the peak output, detecting peaks in the output of any of the magnetic reading heads during a predetermined time period from the time at which the first peak was detected and recording the detected peak outputs that occurred during the predetermined time period. The invention may also include constructing an image using the recorded peak outputs and the detection process may be amplitude qualified.

Still yet another alternative aspect of the invention again includes detecting a peak in the output of any of the magnetic reading heads, recording the value of the peak output, detecting peaks in the output of any of the magnetic reading heads during a first predetermined time period from the time at which the first peak was detected, recording the detected peak outputs that occurred during the first predetermined time period and forming a fingerprint from at least one of the recorded peak outputs.

In still yet another further alternative aspect of the invention, the detection of peaks is amplitude qualified and the invention may also involve locating a boundary of the magnetic medium using the output of the magnetic reading heads, detecting a peak in the output of any of the magnetic reading heads that occurs after a specified time determined relative to the end of the predetermined time period, recording the value of the peak output, detecting peaks in the output of any of the magnetic reading heads during a second predetermined time period from the time of the detection of the first peak occurring after the specified time, recording the detected peak outputs that occurred during the second predetermined time period and forming a fingerprint that includes at least one peak output recorded prior to the specified time and at least one peak output recorded after the specified time.

Still yet another further alternative aspect of the invention again includes identifying a magnetic fingerprint including the magnetic field of a region of the magnetic medium including a portion of one of the magnetic flux transitions, recording the magnetic fingerprint, locating the region of the magnetic medium including a portion of one of the magnetic flux transitions, measuring the magnetic field at the located region, comparing the measured magnetic field to the corresponding portion of the recorded fingerprint. The invention may also include authenticating the document using information including the comparison of the measured magnetic field with the corresponding portion of the recorded fingerprint.

DETAILED DESCRIPTION

Figure 1:
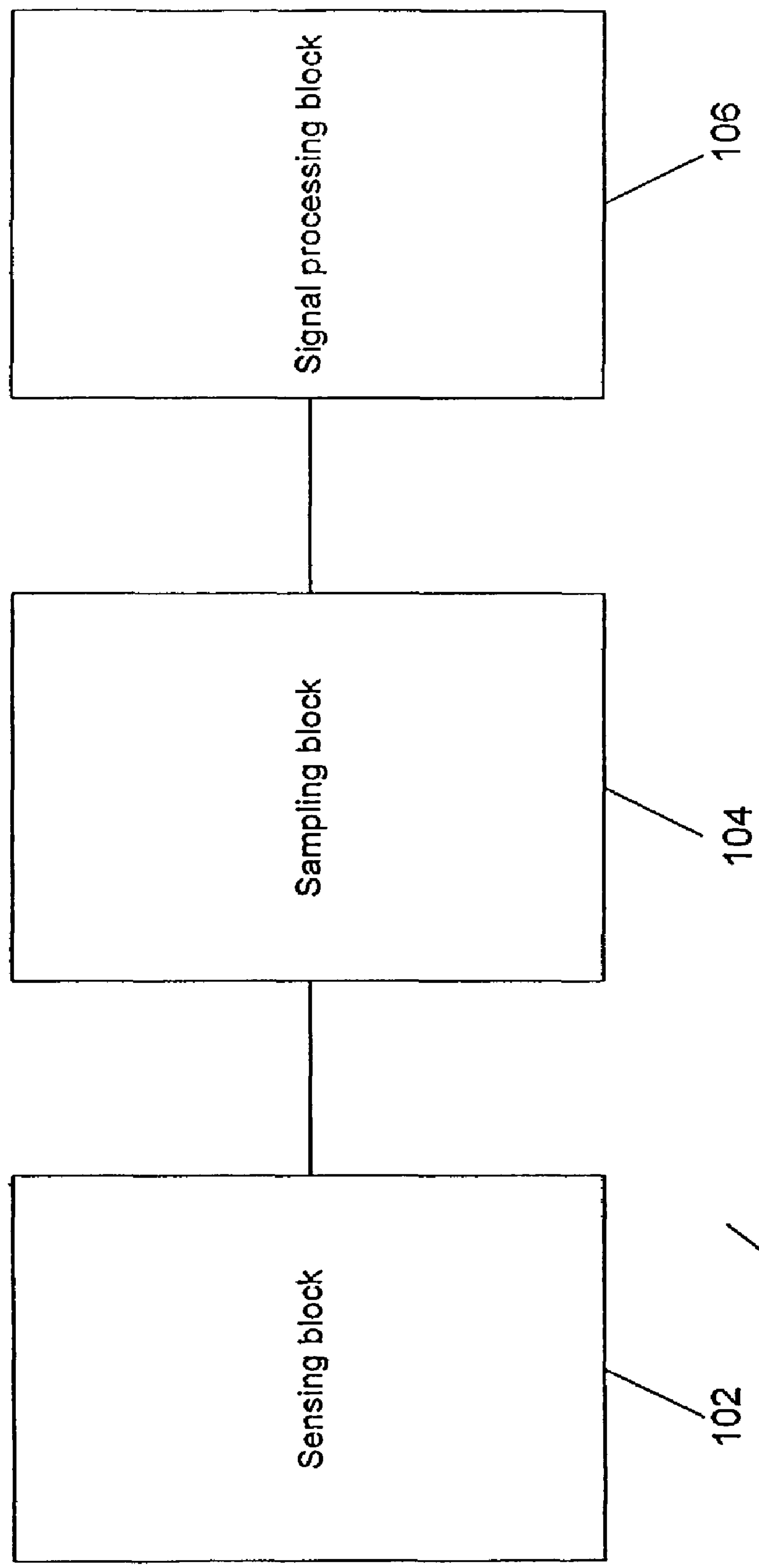
FIG. 1 is a block diagram schematically illustrating components of a magnetic imaging system in accordance with the present invention.

Referring to the drawings, systems for imaging magnetic fields and systems for verifying the authenticity of documents constructed in accordance with the present invention are illustrated. Several of the embodiments enable the construction of an image of a magnetic field. The systems can use these images to locate features within a magnetic field or to locate magnetic fingerprint information. Other systems do not generate a complete image of a magnetic field. Instead they image portions of a magnetic field and these partial images can be used for a number of purposes including document verification. A feature of many of the embodiments is the use of an array of magnetic reading heads to generate information from which a partial or a complete image of a magnetic field can be constructed.

In the following discussion, it will be appreciated that a magnetic field is a vector quantity and that the aspect of the magnetic field measured by a magnetic sensor depends on the type of the magnetic sensor used. In one embodiment configured to image a magnetic stripe, a magneto-resistive magnetic reading head is used to measure the component of the magnetic field perpendicular to the plane of the magnetic stripe. The term magnetic field intensity is used to refer to the perpendicular component of the magnetic field measured by magneto-resistive magnetic reading heads. One skilled in the art would also appreciate that other components of the magnetic field may also be used to generate measurements of the magnetic field using other magnetic reading heads. One such example is an inductive magnetic reading head that measures rates of change of magnetic flux.

A system for imaging a magnetic field in accordance with the present invention is illustrated in FIG. 1. The system 100 includes a sensing block 102, a sampling block 104 and a signal processing block 106. The sensing block contains sensing circuitry and is connected to the sampling block. The sampling block contains sampling circuitry and is connected to a signal processing block 106, which contains signal processing circuitry. The circuitry in the sensing block, the sampling block and the signal processing block can be implemented using discrete components, application specific integrated circuits (ASIC) or a combination of microprocessors, software, discrete components and/or ASICs.

The sensing block contains one or more magnetic reading heads and is used to measure characteristics of a magnetic field. The sensing block outputs signals to the sampling block indicative of the measured characteristics of the magnetic field. Movement of the sensing block relative to the magnetic field causes the sensing block to generate output signals that can be used to extract information concerning features of the magnetic field that lie perpendicular to the motion of the sensing block relative to the magnetic field and which are typically not capable of being observed using a single fixed magnetic reading head. The sampling block contains circuitry for sampling the signal output by the sensing block at specified times. The sampling block converts the samples of the sensing block output into data signals that can be manipulated by the signal processing block. The data signals are stored in the sampling block until they can be read by the signal processing block, at which point the signals are output by the sampling block to the signal processing block. The signal processing block receives data signals from the sampling block. The signal processing block stores the data signals and can generate an image using the stored data signals.

Figure 2:
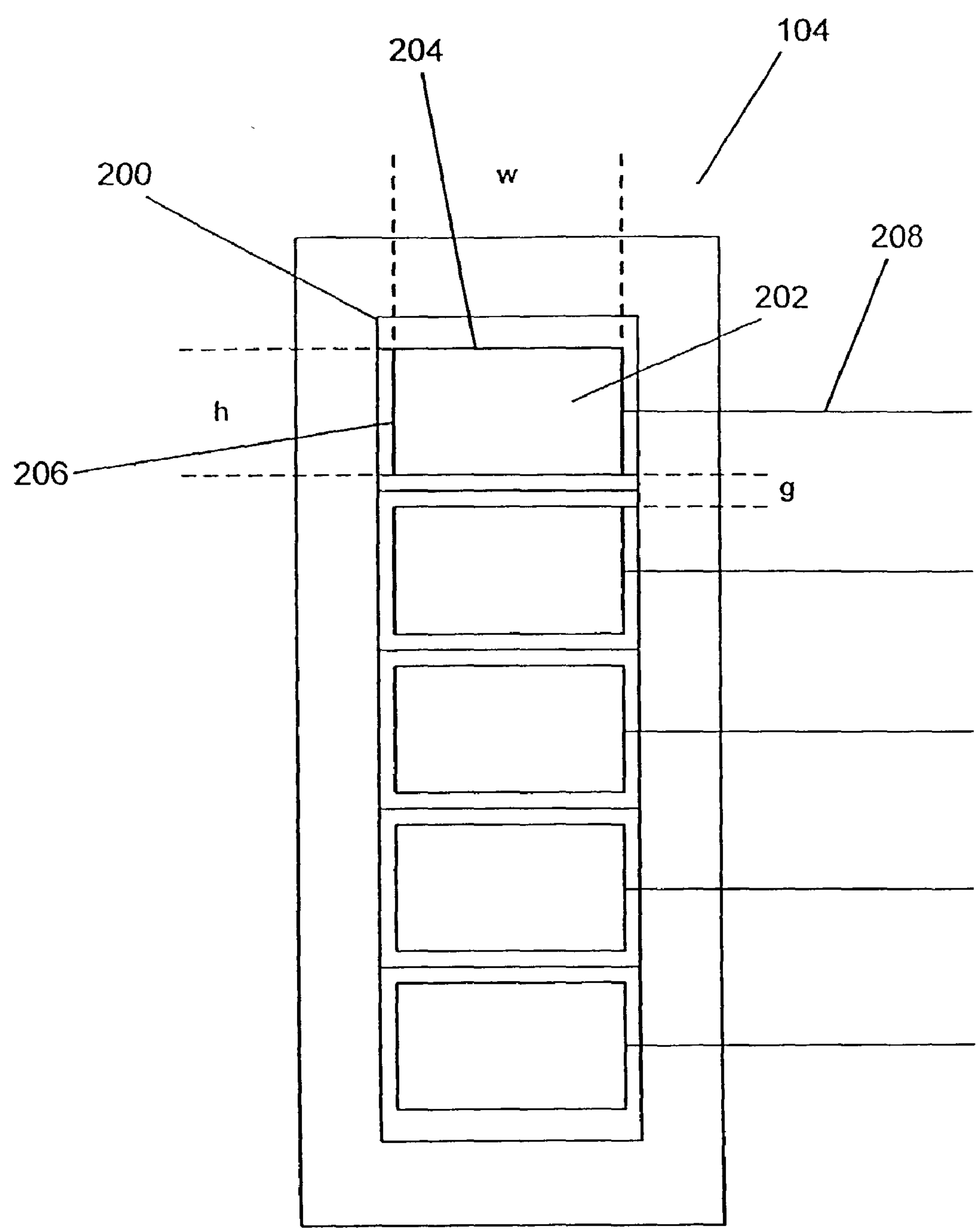
FIG. 2 is a block diagram schematically illustrating a magnetic reading head array.

One embodiment of a sensing block is illustrated in FIG. 2. The sensing block measures the characteristics of a portion of a magnetic field. The sensing block includes an array of magnetic reading heads 200. The array of magnetic reading heads is constructed from a number of magnetic reading heads 202. Each magnetic reading head has a reading aperture. The reading aperture is the area of the reading head through which the magnetic flux being measured by the reading head passes. In the embodiment shown in FIG. 2, the magnetic reading head aperture is rectangular and has a width w, corresponding to the length of the longitudinal edge 204 of the magnetic reading head and a height h, corresponding to the length of the lateral edges 206 of the magnetic reading head. In other embodiments, magnetic reading heads utilizing different shaped apertures can be used. Preferably, aperture shapes capable of forming a pattern that covers the entire magnetic field are used. More preferably, rectangular magnetic reading head apertures are used.

A closer inspection of the array of reading heads also reveals that there are gaps of width g between the longitudinal edges of the magnetic reading heads. These gaps represent areas that do not fall within the apertures of any of the magnetic reading heads.

Each magnetic reading head has an output 208 and each magnetic reading head generates a signal at its output that is indicative of the portion of the magnetic field being measured by that magnetic reading head. The type of signal generated depends on the type of magnetic reading head used in the construction of the array of magnetic reading heads. Any type of magnetic reading head, including magneto-resistive reading heads or inductive reading heads, can be used in the construction of the array of magnetic reading heads.

In other embodiments, two dimensional arrays of magnetic reading heads can be used in the construction of the sensing block. Other embodiments can also include sensing blocks with one or more magnetic reading heads mounted on a mechanical arm for moving the reading head in one or more directions.

Figure 3:
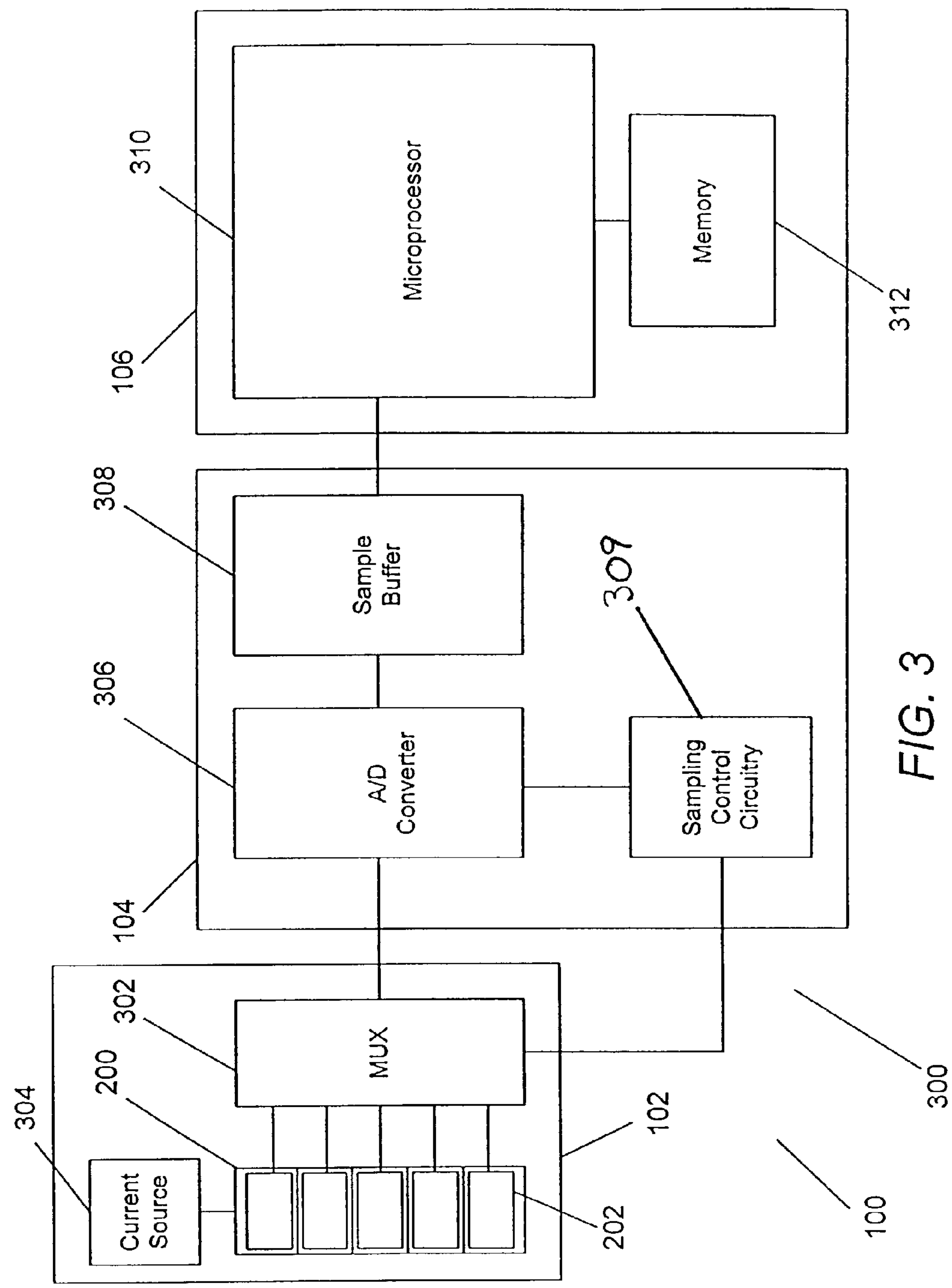
FIG. 3 is a circuit diagram schematically illustrating a magnetic imaging system that includes an array of magnetoresistive reading heads.

The sensing block, sampling block and signal processing block are illustrated in greater detail in FIG. 3. A closer inspection of FIG. 3 reveals that the sensing block 102 of the system 100 includes an array of magnetic readings heads 200 constructed from magneto-resistive reading heads 202. The outputs of the magnetic reading heads are connected to the inputs of a multiplexer 302 and to a current source 304. The multiplexer is controlled via an input from the sampling block 104. The input of the multiplexer that is connected to ground by the multiplexer is controlled by a signal provided by the sampling block.

The sampling block 104 of FIG. 3 includes sampling control circuitry 300, an analog to digital converter (A/D converter) 302 and a sample buffer 308. The current source 309 is connected to the A/D converter. Connections also exist between the sampling control circuitry 309 and the A/D converter and between the A/D converter and the sample buffer.

The signal processing block 106 of FIG. 3 includes a microprocessor 306 and memory 308. Connections exist between the sample buffer and the microprocessor and between the microprocessor and memory.

The magneto-resistive reading heads, shown as 202 of FIG. 3, measure magnetic flux using the magneto-resistive effect. If current is provided to a magneto-resistive magnetic reading head, variations in the resistance of the reading head due to the magneto-resistive effect can be observed. The current source 304 provides current to the magneto-resistive magnetic reading heads 202.

The sampling control circuitry generates signals that are provided to the multiplexer in order to select which input signal will be connected to ground by the multiplexer and to the A/D converter to direct the A/D converter to sample at a particular time. In one embodiment, the sampling control circuitry sends a first digital signal to the multiplexer and a second digital signal to the A/D converter. The first digital signal indicates which of the magnetic reading heads the multiplexer is to connect to ground. The second digital signal indicates the time at which the A/D converter is to sample its input. In other embodiments, the signals sent by the sampling control circuitry can be analog or a combination of analog and digital signals.

The rate at which the reading heads are sampled by the A/D converter is determined according to signals generated by the sampling control circuitry. In one embodiment, the sampling control circuitry generates signals to control the rate at which the magnetic reading heads are sampled by the A/D converter in response to signals provided to the sampling control circuitry by the microprocessor. In other embodiments the rate at which the sampling control circuitry sends signals to the magnetic reading heads and to the A/D converter is fixed at a user specified rate.

In one embodiment, the sampling control circuitry is constructed from discrete components. In other embodiments the sampling control circuitry can be constructed using a microprocessor and memory, using an ASIC or using a combination of discrete components, ASICs, microprocessors and memory.

In the embodiment of the A/D converter shown in FIG. 3, the A/D converter samples its input at a time indicated by the second signal from the sampling control circuitry. The A/D converter converts the analog sample of the magnetic reading head output into a digital signal, which corresponds to a digitized version of the analog sample. The A/D converter outputs the digital signal to the sample buffer.

The number of bits required in the output of the A/D converter depends on the required sensitivity of the system relative to the peak amplitude of the signals generated by the magnetic reading heads. In one embodiment, pre-amplifiers with automatic gain control can be used to reduce the number of bits required by the A/D converter. In other embodiments, the number of bits required for the A/D converter can be reduced using companding.

In the embodiment of FIG. 3, a single A/D converter is used to sequentially convert the analog input signals into digital signals. In other embodiments a current source and an A/D converter is provided for each magnetic reading head and each of the magnetic reading heads are sampled simultaneously.

The sample buffer 308 is typically a register used to temporarily store digital signals output from the A/D converter until the data can be read by the microprocessor. In embodiments where the rate at which data is sampled from the magnetic reading heads is greater than the rate at which the buffer is accessed by the microprocessor, then the buffer may contain enough storage locations to store more than one sample. In other embodiments, direct memory access circuitry may be provided to enable the samples to be written directly to the memory. The microprocessor 310 receives samples from the sample buffer and uses the samples to create an image in at least two dimensions of the magnetic field that the system is imaging. In other embodiments, the microprocessor analyzes the samples and provides output signals to the sampling control circuitry to adjust the rate at which the outputs of the magnetic reading heads are sampled by the A/D converter. The memory 312 can be used to store software and data for the microprocessor. The microprocessor uses the memory to store the samples it obtains from the sample buffer and to store the reconstructed image of the magnetic field being imaged by the system.

Figure 4:
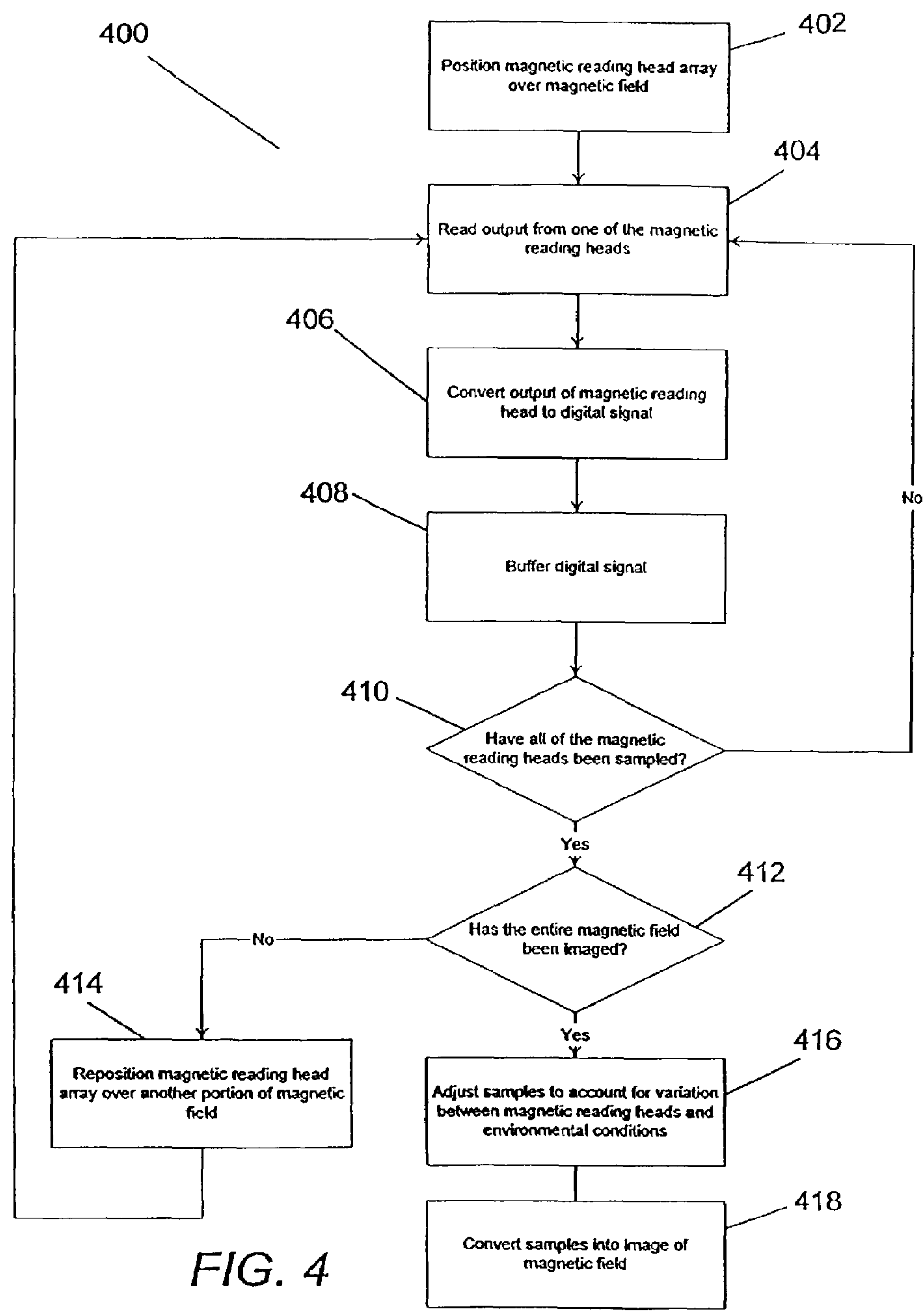
FIG. 4 is a block diagram illustrating a process for generating an image of a magnetic field in at least two dimensions.

A block diagram illustrating a process for generating an image of a magnetic field in accordance with the present invention is illustrated in FIG. 4. The process 400 involves positioning (402) a magnetic reading head array over a portion of the magnetic field. The output from one of the magnetic reading heads within the array of magnetic reading heads is sampled (404) and the sample is converted (406) into a digital signal. The digital signal is then recorded (408). Once the digital signal has been recorded, then a decision (410) is made to determine whether any of the reading heads have not been sampled. If additional reading heads require sampling, then output from one of the reading heads requiring sampling is read (404).

If the output from each of the magnetic reading heads has been sampled, then a decision (412) is made concerning whether the entire magnetic field has been imaged. If a portion of the magnetic field remains unimaged, then the array of magnetic reading heads is repositioned (414) over an unimaged portion of the magnetic field and data is read (404) from the magnetic reading heads. Once the entire magnetic field has been imaged, then the recorded digital signals are adjusted to compensate (416) for variation between the magnetic reading heads and to compensate for variation in environmental conditions such as temperature and then the recorded digital signals are converted into an image of the magnetic field. In other embodiments of the process, adjusting the samples to compensate for variation between the magnetic reading heads and to compensate for variation in environmental conditions can be performed as the samples are recorded and prior to the entire magnetic field being imaged.

Figure 5:
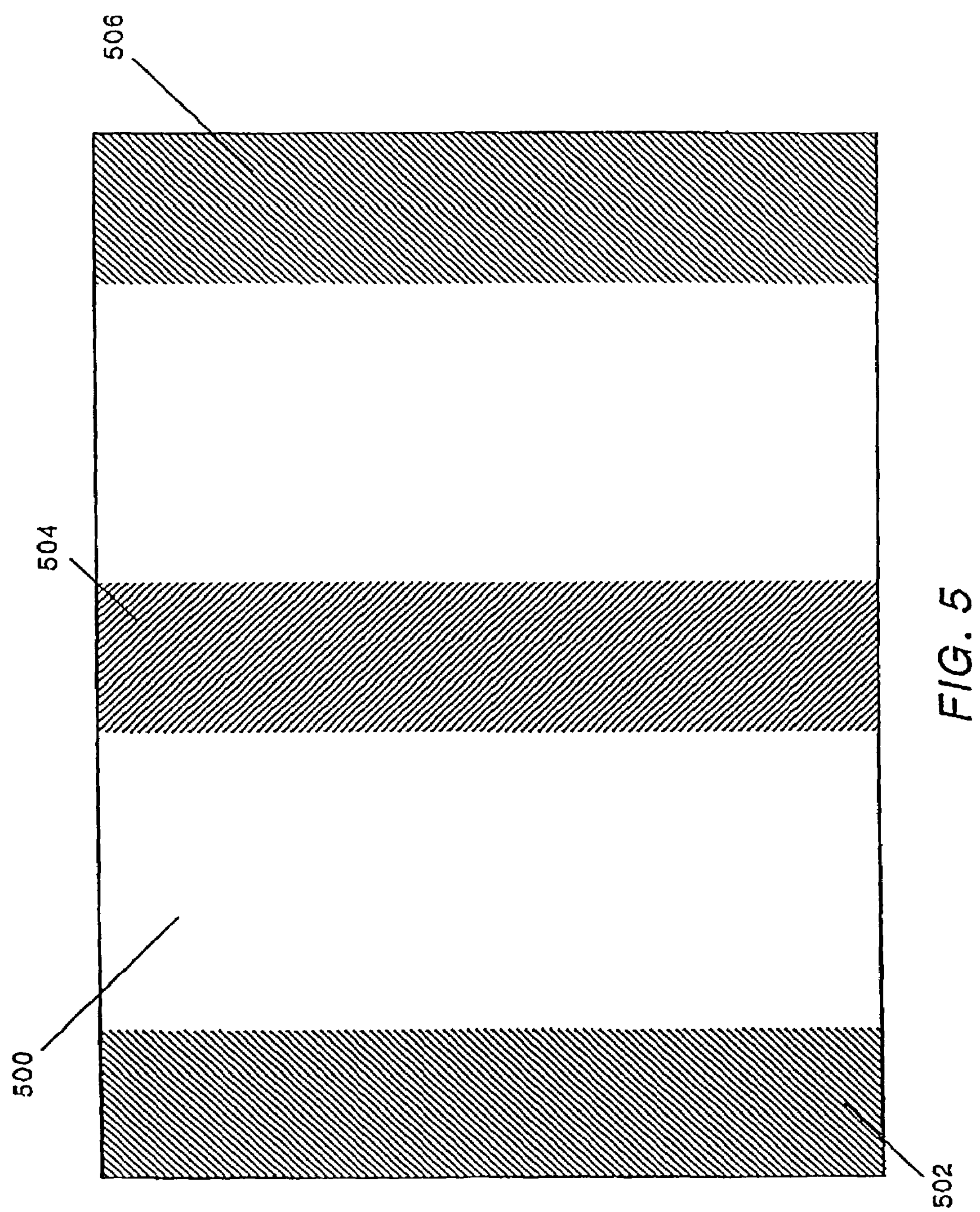
FIG. 5 is a block diagram schematically illustrating the intensity of a magnetic field that includes three bands of high magnetic field intensity.

The functions performed by the signal processing block in constructing an image of a magnetic field depend on the nature of the array of magnetic reading heads used to image the magnetic field and the method used to sample the output of the array of magnetic reading heads. The functions performed by the signal processing block in order to construct an image of a magnetic field can be understood by examining data output by the sampling unit, when the magnetic field within a rectangular area 500 illustrated in FIG. 5 is imaged.

The magnetic field within the rectangular area 500 has three bands 502, 504 and 506 where the magnetic field intensity is greater than in other regions of the magnetic field. When a magnetic field is imaged by magnetic reading heads, each sample obtained from the magnetic reading heads forms a discrete piece of information relating to a discrete area of the magnetic field being imaged. Each discrete piece of information can be represented as a 'mixel' 602. A 'mixel' is an area assigned a particular value related to the average magnetic field strength in that area. 'Mixels' can be used to construct an image of a magnetic field from which features of the field in directions other than the direction of motion of the magnetic reading head relative to the magnetic field can be determined. If the magnetic field within the rectangular area 500 is imaged in accordance with the process 400 illustrated in FIG. 4 using an embodiment of the system 100 that includes the array of magnetic reading heads shown as 200 in FIG. 2, then the sampling unit outputs the data corresponding to the 'mixels' shown as 600 in FIG. 6.

Figure 6:
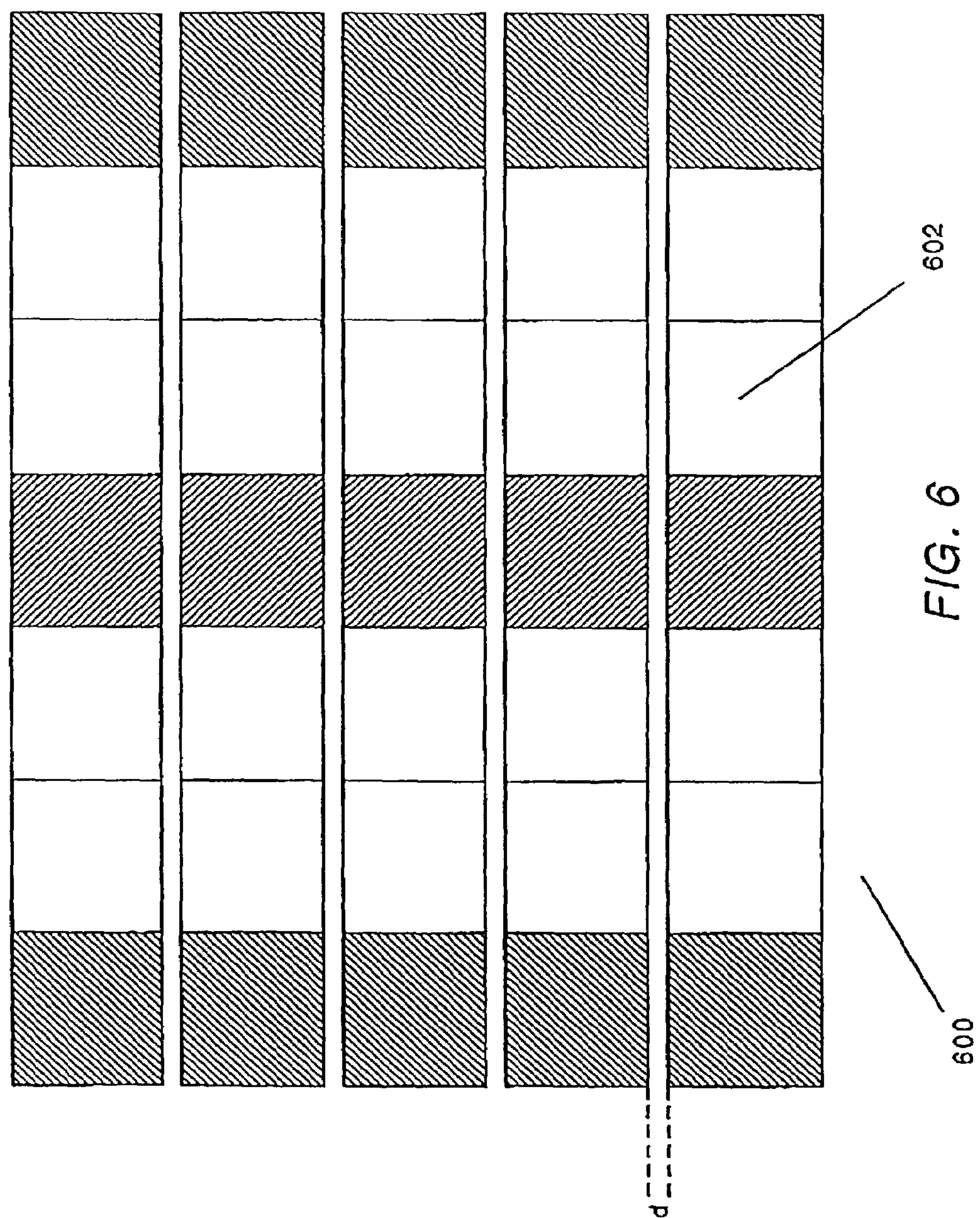
FIG. 6 is a block diagram schematically illustrating 'mixels', which are areas assigned a particular value associated with the average magnetic field intensity in that area, generated by a magnetic imaging system imaging the intensity of the magnetic field shown in FIG. 5 using the array of magnetic reading heads illustrated in FIG. 2 in accordance with the process of FIG. 4.

The 'mixels' 600 of FIG. 6 do not contain information concerning all of the magnetic field within the rectangular area 500. Gaps exist between the longitudinal edges 204 of the magnetic reading heads in the array of magnetic reading heads 200. Therefore, stripes of data are missing in the output of the sampling block illustrated in FIG. 6. The width d of the stripes of missing data corresponds to the width g of the gaps between the longitudinal edges of the magnetic reading heads in the array of magnetic reading heads.

The gaps of information in the output of the sampling block can be recovered if the number and size of the magnetic reading heads in the array of magnetic reading heads are chosen to satisfy Nyquist's Sampling Theorum. If Nyquist's Sampling Theorum is satisfied, then the microprocessor can reconstruct the image by applying techniques well known in the signal processing art such as bandwidth limitation using frequency profiling or using FIR or IIR filtering.

Figure 7:
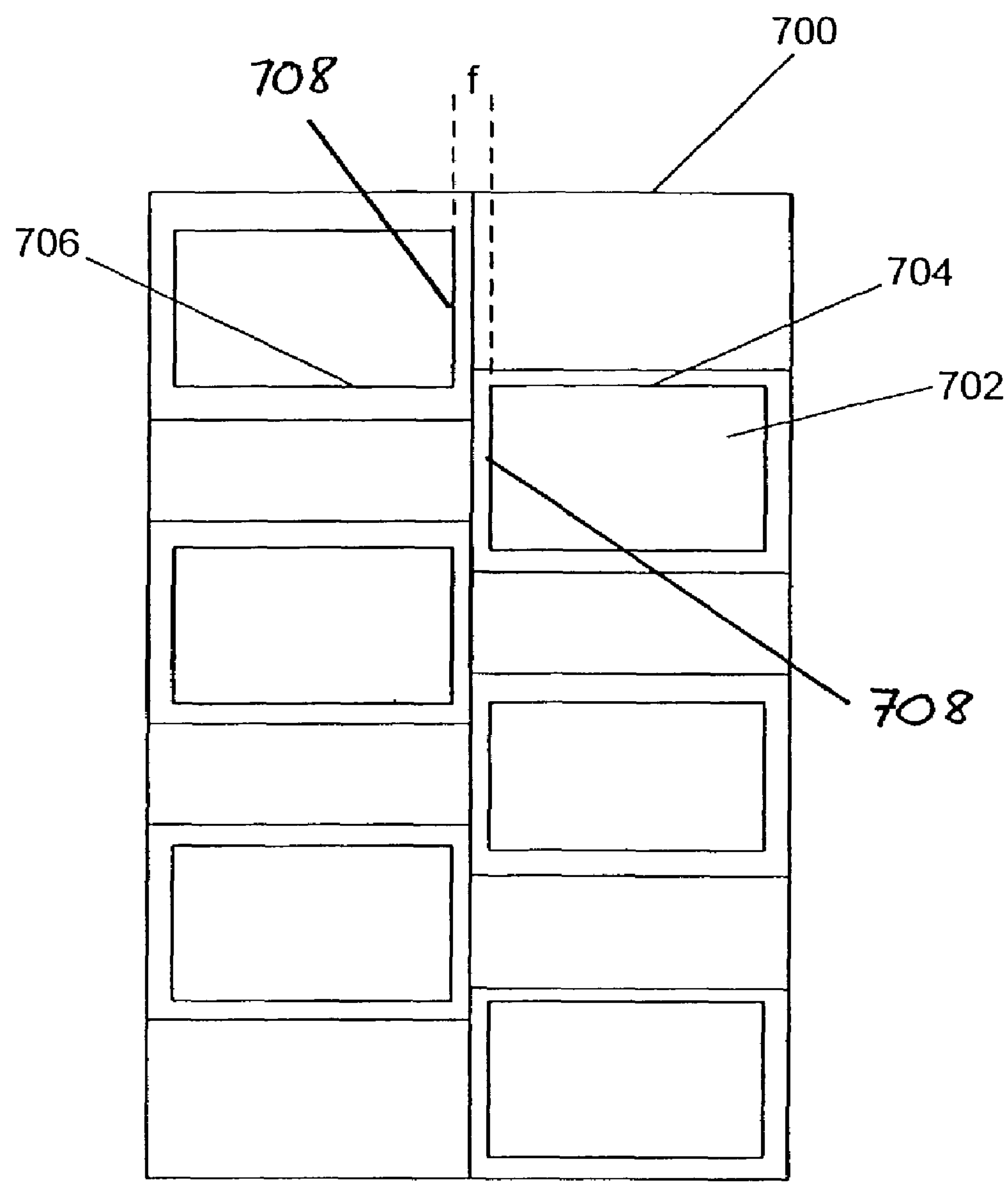
FIG. 7 is a block diagram schematically illustrating a staggered array of magnetic reading heads.

The above bandwidth limiting techniques can be computationally intensive for the microprocessor in the signal processing block. In alternative embodiments, a staggered array of magnetic reading heads is used in the sensing block to eliminate the vertical gaps between the magnetic reading heads. An embodiment of a staggered array of magnetic reading heads is illustrated in FIG. 7. The staggered array of magnetic reading heads 700 includes a number of magnetic reading heads 702. Each magnetic reading head has an upper longitudinal edge 704 and a lower longitudinal edge 706. The magnetic reading heads are configured so that the lower longitudinal edge 706 is aligned with the upper longitudinal edge 704 of the closest magnetic reading head. The staggered configuration shown in FIG. 7 introduces gaps of width f between the lateral edges 708 of the magnetic reading heads. However, the gaps between the longitudinal edges of the magnetic reading heads are substantially eliminated.

Figure 8:
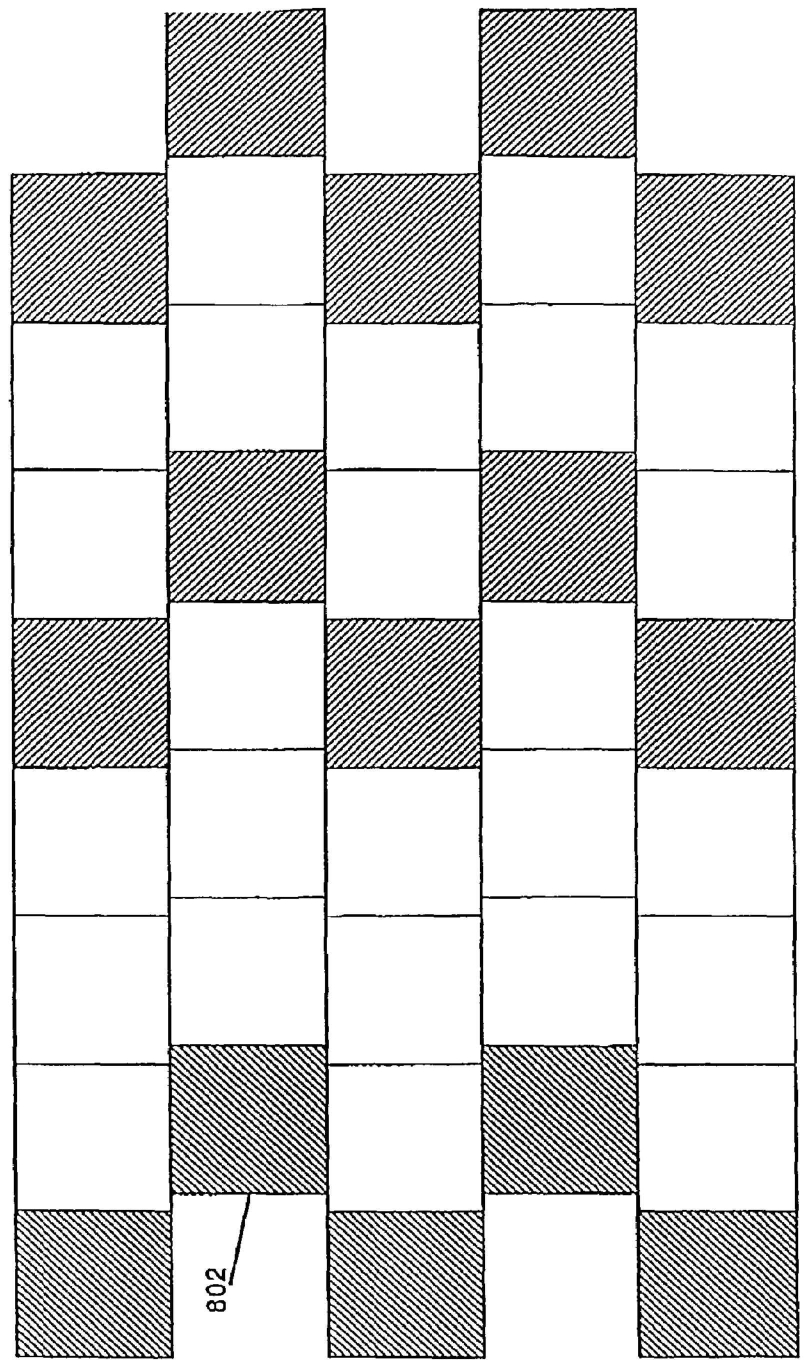
FIG. 8 is a block diagram schematically illustrating the 'mixels' generated by a magnetic imaging system that is imaging the intensity of the magnetic field shown in FIG. 5 using the array of magnetic reading heads illustrated in FIG. 7 in accordance with the process of FIG. 4.

When the magnetic field within the rectangular area 500 of FIG. 5 is imaged in accordance with the process 400 illustrated in FIG. 4 using an embodiment of the system 100 including the staggered array of magnetic reading heads 700 of FIG. 7, the sampling block outputs data corresponding to the 'mixels' shown as 800 in FIG. 8. Unlike the data illustrated in FIG. 6, the data illustrated in FIG. 8 contains information concerning the entire magnetic field. The data illustrated in FIG. 8 does not contain stripes representing portions of the magnetic field that were not imaged, because the staggered array of magnetic reading heads substantially eliminates the gaps between the longitudinal edges of the reading heads. The gaps between the lateral edges of the magnetic reading heads in the staggered array of magnetic reading heads do not result in data loss, because the repositioning of the array of magnetic reading heads with each sample can be calibrated to substantially eliminate longitudinal gaps between the samples.

A consequence of using a staggered array of magnetic reading heads is that the rows 800 of 'mixels' output by the sampling block are also staggered relative to each other. As a result, the signal processing block must shift the rows so that the columns are aligned relative to each other. The small gaps of width f between the lateral edges of the magnetic reading heads can cause the rows of 'mixels' to retain longitudinal offsets of an order less than a 'mixel' or a 'sub-mixel' offset relative to each other after shifting. Depending on the required precision of the system, the 'sub-mixel' offsets can be ignored or the signal processing block can eliminate the 'sub-mixel' offsets by generating new rows of 'mixels' that are not offset relative to each other. One method of generating new rows of 'mixels' is to use a weighted average. A weighted average creates a new 'mixel' by adding the values of adjacent 'mixels' that are weighted in proportion to the portion of the area of each 'mixel' that falls within the area of the new mixel. In other embodiments, where the width of the magnetic reading heads is sufficient to satisfy Nyquist's Sampling Theorum, the signal processing methods described above in combination with shifting can be used to reconstruct an image of the magnetic field in at least two dimensions.

Figure 9:
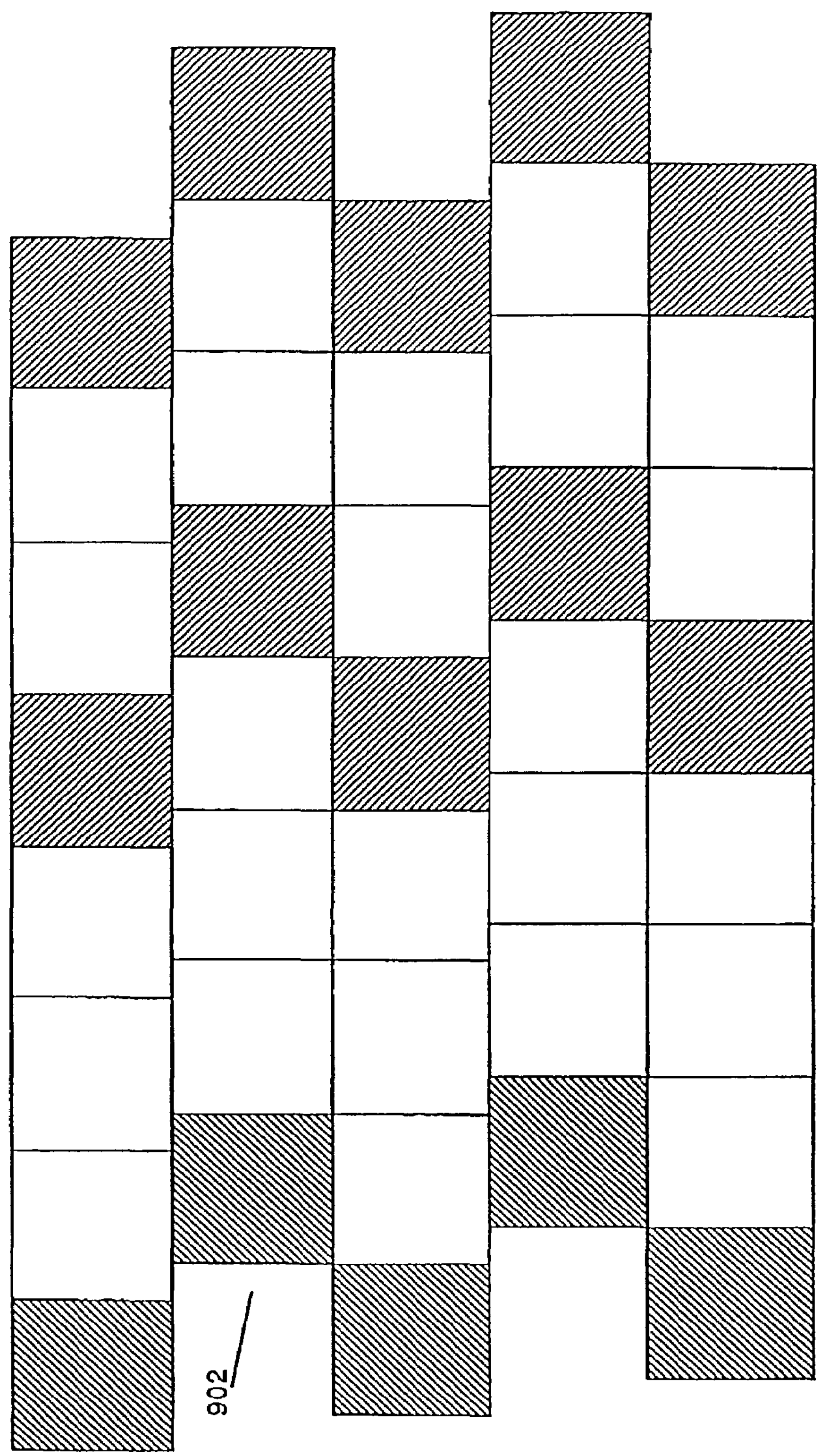
FIG. 9 is a block diagram schematically illustrating the 'mixels' generated by a magnetic imaging system that is imaging the intensity of the magnetic field shown in FIG. 5 using the array of magnetic reading heads illustrated in FIG. 7, where the array of magnetic reading heads is continuously moving relative to the magnetic field.

The system of the present invention can also be used in situations where the array of magnetic reading heads is continuously moving relative to the magnetic field. FIG. 9 shows the output produced by an embodiment of the system 100 having the staggered array of magnetic reading heads 700 shown in FIG. 7, when the system is used to image the magnetic field within the rectangular area 500 of FIG. 5 and the array of magnetic reading heads is continuously moving relative to the magnetic field.

FIG. 9 illustrates that the rows of 'mixels' output by the sampling block include an additional offset, when compared to the offset between the rows of 'mixels' shown as 800 in FIG. 8 that results when the magnetic reading heads are stationary during sampling. The reason for the additional offset is that the magnetic reading heads are sequentially sampled. Therefore, the position of the array of magnetic reading heads relative to the magnetic field is altered between samples of the magnetic reading heads within the array of magnetic reading heads. This offset can be removed using the methods described above if the velocity of the array of magnetic reading heads relative to the magnetic field is known.

One method of determining the relative velocity of the array of magnetic reading heads is to look for known features within the magnetic field and to calculate the time between the detection of these features. If there are known features in the magnetic field such as magnetic flux transitions, then these features can be used to determine the velocity of the magnetic reading heads relative to the magnetic field and align the rows of data output by the sensing block. Characteristic features can be located using edge detection algorithms or by searching for 'mixels' in the output of the sampling block that have particular characteristics such as peak value.

After the rows have been re-aligned using known features of the magnetic field, small 'sub-mixel' offsets can remain. The 'sub-mixel' offsets can be corrected using weighted averages or using a combination of FFTs and IFFTs as described above.

Figure 10:
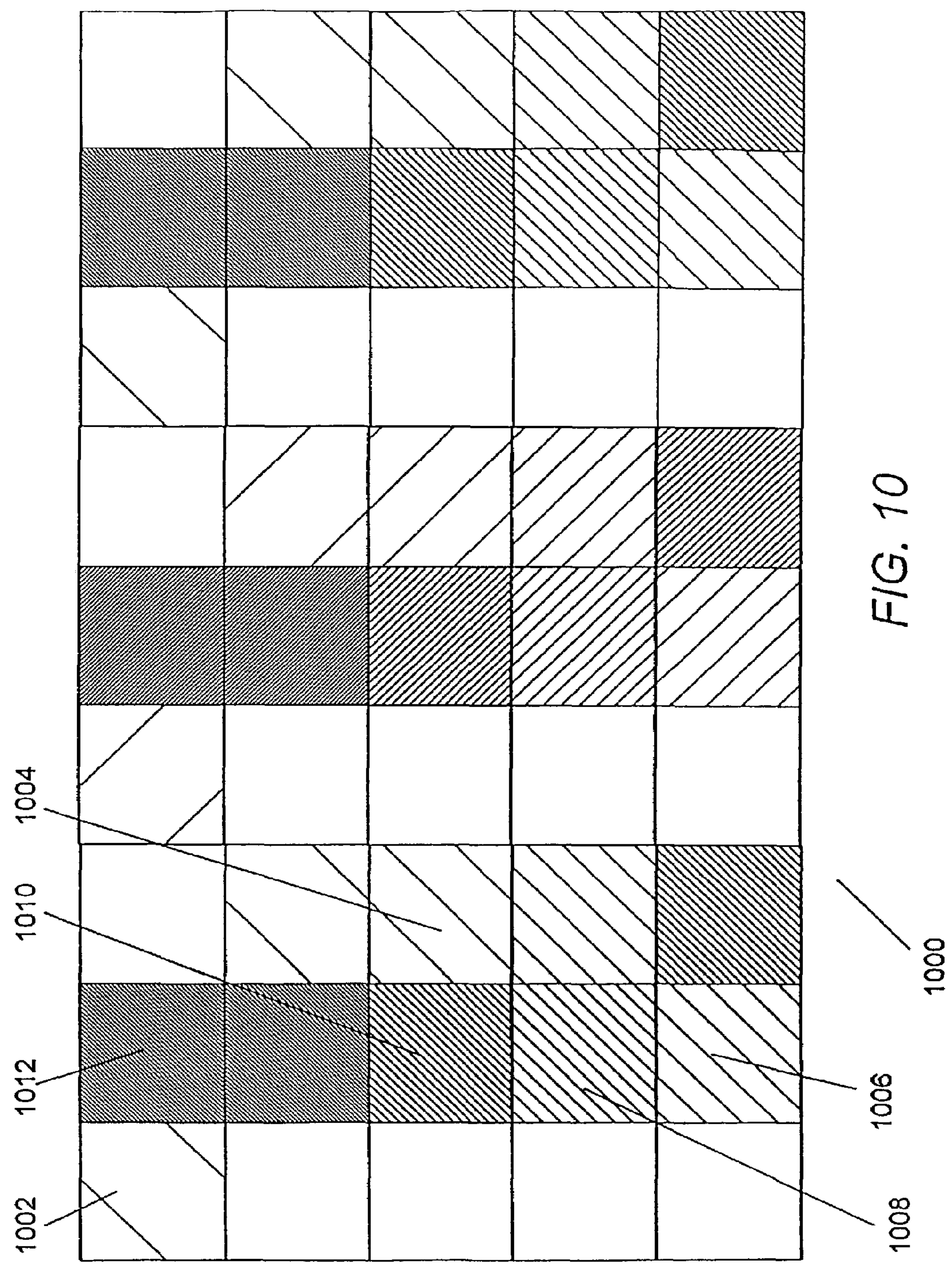
FIG. 10 is a block diagram schematically illustrating the 'mixels' generated by a magnetic imaging system imaging the intensity of the magnetic field of FIG. 5 using the array of magnetic reading heads shown in FIG. 2, where the array of magnetic reading heads has an azimuth misalignment.

Features of the magnetic field can also be used for the purpose of realigning an image generated by the signal processing block so that the generated image shares the same alignment as the magnetic field. If the array of magnetic reading heads is aligned at an angle that is not perpendicular to the direction of the motion of the array of magnetic reading heads relative to the magnetic field being measured, then the output of the sampling block can be effected. FIG. 10 illustrates the 'mixels' that are the output of the sampling block when an embodiment of the system 100 in accordance with the present invention, having the array of magnetic reading heads illustrated as 200 in FIG. 2, is used to image the magnetic field illustrated as 500 in FIG. 5 in accordance with the process 400 illustrated in FIG. 4.

The 'mixels' 1000 illustrated in FIG. 10 are coded with levels of shading corresponding to magnetic field intensity. The scheme used to assign levels of shading to 'mixels' involves the use of seven possible levels of shading, one of which is the absence of shading. Each level of shading corresponds to a range of magnetic field intensities that is mutually exclusive to the ranges of magnetic field intensities represented by the other levels of shading.

In FIG. 10, the absence of shading indicates the absence of any significant magnetic field. The shadings assigned to the 'mixels' 1002, 1004, 1006, 1008, 1010, 1012 are in increasing order of magnetic field intensity. The shading of the 'mixel' 1012 corresponds to a range of intensities that includes the intensity of the bands 502, 504, 506 in the magnetic field within the rectangular area 500 of FIG. 5.

Figure 11:
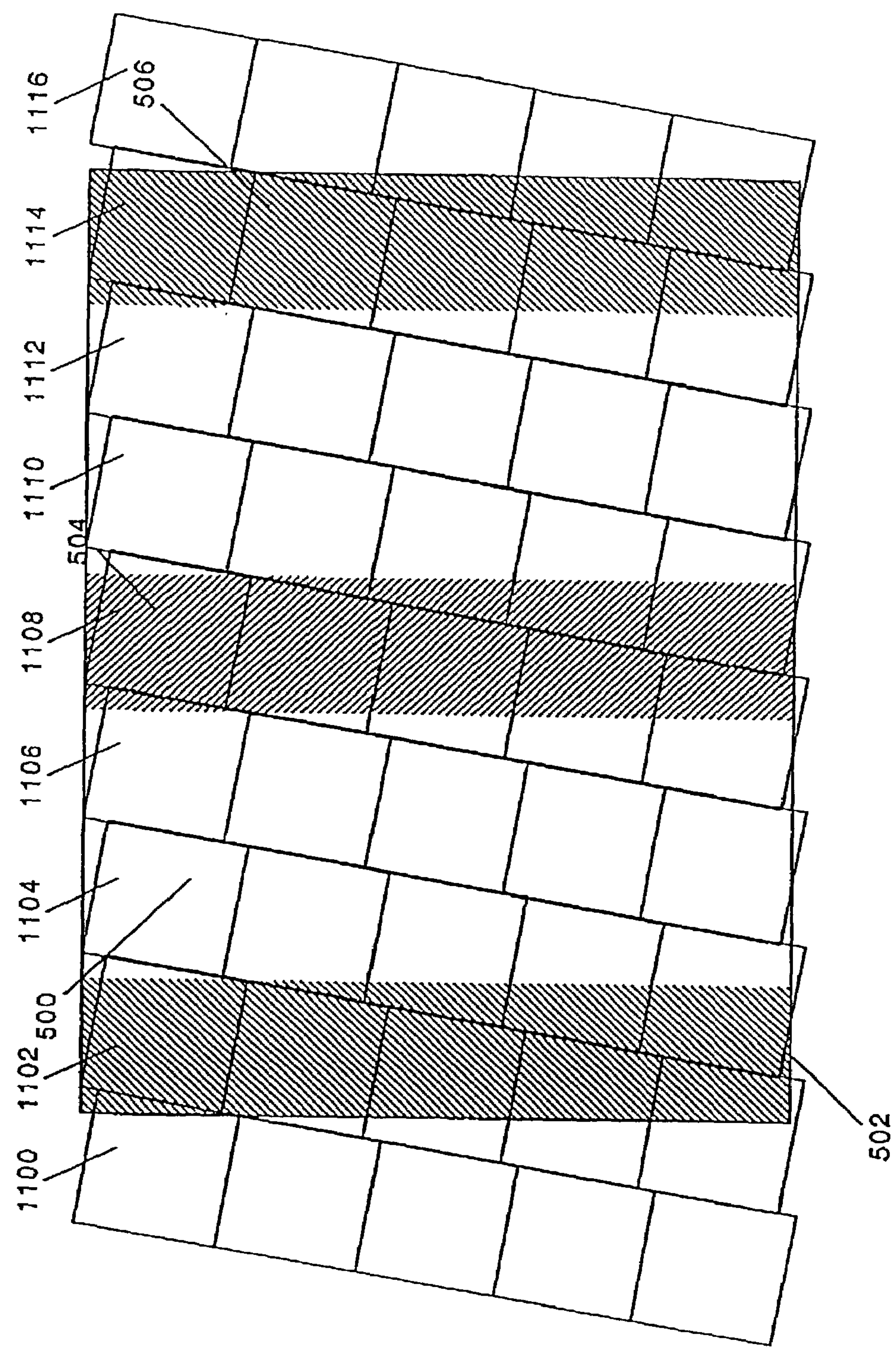
FIG. 11 is a block diagram illustrating the positions occupied by the array of magnetic reading heads relative to the magnetic field shown in FIG. 5 during the imaging of the magnetic field by the system that generated the output illustrated in FIG. 10.

The way in which the 'mixels' 1000 are derived is illustrated in FIG. 11. FIG. 11 shows the nine positions 1100, 1102, 1104, 1106, 1108, 1110, 1112, 1114, 1116 in which the array of magnetic reading heads 200 is placed when the samples of the magnetic field 500 are taken. Each of the positions 1100, 1102, 1104, 1106, 1108, 1110, 1112, 1114, 1116 corresponds to one of the columns of 'mixels' in FIG. 10.

A closer inspection of FIG. 11 reveals that the positions 1100, 1102, 1104, 1106, 1108, 1110, 1112, 1114, 1116 in which the array of reading heads 200 are placed are not substantially perpendicular to the direction of motion of the array of reading heads as it moves from position 1100 to position 1116. When an array of magnetic reading heads is not perpendicular to the motion of the array of reading heads relative to the magnetic field, the array of reading heads is said to have an azimuth misalignment. In typical applications, a small azimuth misalignment can be tolerated. However, FIG. 10 illustrates that a significant azimuth misalignment can result in an image of magnetic field intensity that differs considerably from the actual intensity of the imaged magnetic field.

Embodiments of the signal processing block of the system 100 in accordance with the present invention can use the detailed features obtained when the field is imaged such as the edge of the magnetic field, alignments of magnetic flux transitions or other characteristic patterns to detect azimuth misalignments and to compensate for them. In one embodiment, characteristic features are used to correct errors introduced by azimuth misalignment by offsetting the rows relative to each other. In other embodiments requiring greater accuracy, the azimuth error is corrected by estimating the extent of the azimuth misalignment and then using signal processing algorithms such as those well known in the image processing art to correct the rotation introduced by the azimuth misalignment.

All of the processes used by the signal processing block to account for misalignment of the array of magnetic reading heads or for offsets in the output of the sampling block can also be used in embodiments of the system that use a single magnetic reading head on a mechanical arm or that use a two dimensional array of magnetic reading heads.

In one preferred embodiment, the system of the present invention is used in the authentication of magnetic stripe cards. In this embodiment, the authentication of magnetic stripe cards is performed by imaging a portion of a magnetic stripe in the region between the bits of information as is generally described in U.S. Pat. No. 6,098,881 to DeLand, Jr. et al.

Figure 12:
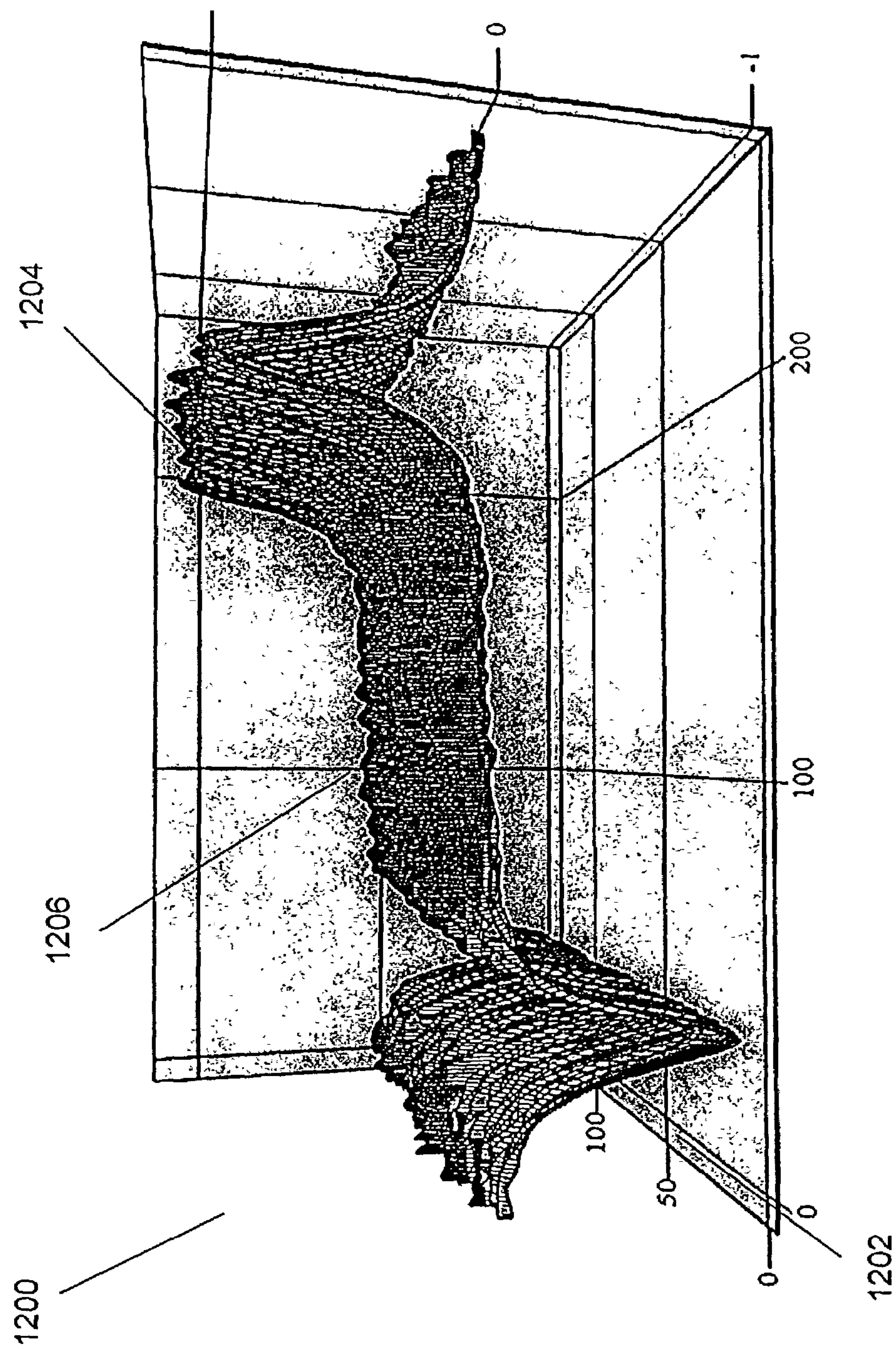
FIG. 12 is an elevation view of a chart that schematically illustrates magnetic field intensity of a portion of a magnetic stripe card.

FIG. 12 shows the magnetic field intensity of a portion of a magnetic stripe card. The magnetic field 1200 includes a first depression 1202 in intensity and a first peak 1204 in intensity. The depression and peak correspond to the recorded bits of information stored on the magnetic stripe. A relatively flat portion 1206 exists between the depression and the peak. A closer inspection of the relatively flat portion reveals that it has an undulating magnetic field intensity with an appearance similar to a noise signal. These undulations occur due to the alignment of individual magnetic particles in the magnetic stripe. The undulations are unique to each magnetic stripe card. Therefore, an accurate image of at least some portion of these undulations can be used to verify the authenticity of the magnetic stripe card.

Figure 13:
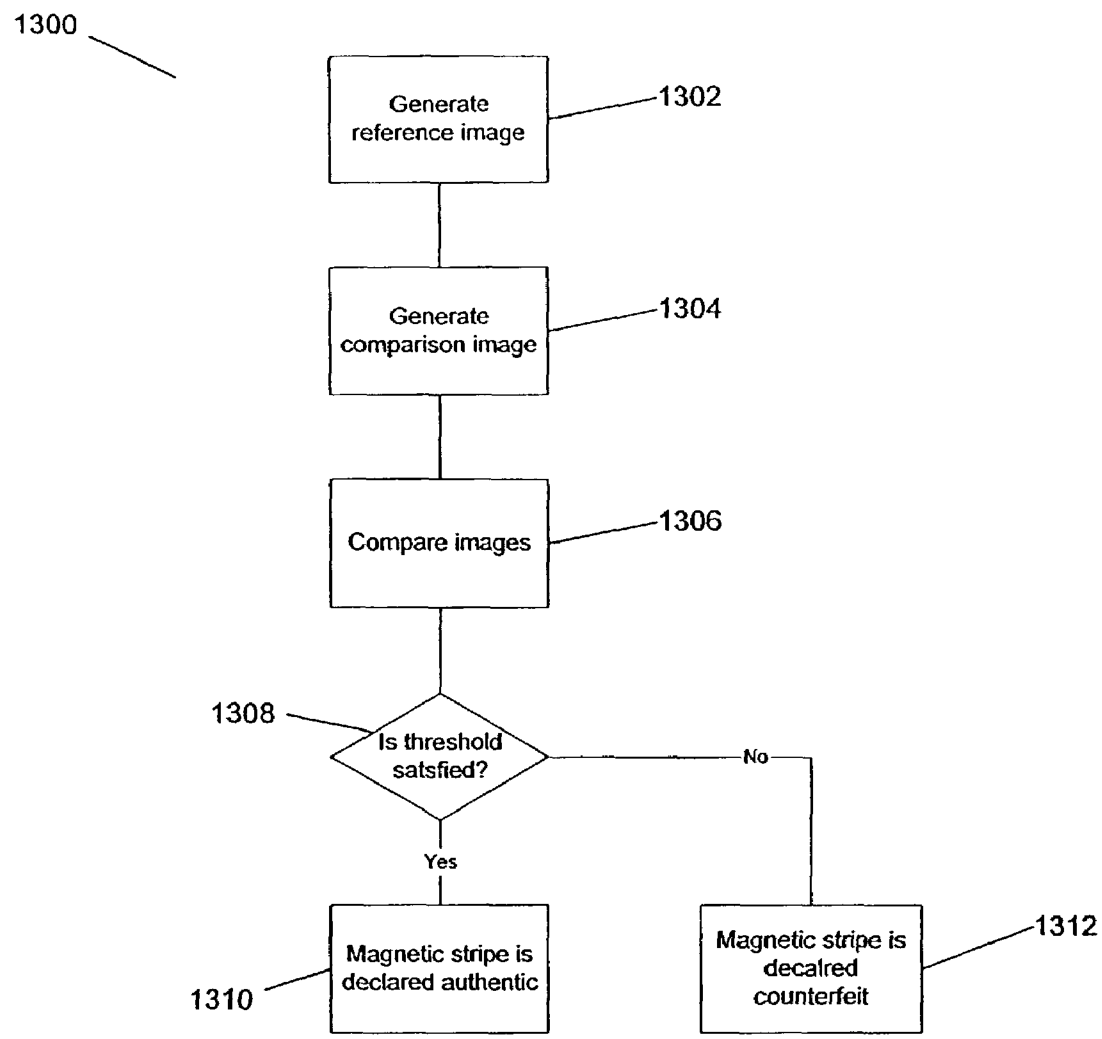
FIG. 13 is a block diagram schematically illustrating a process for authenticating that a magnetic stripe card is an original and not a counterfeit of an original magnetic stripe card.

A block diagram illustrating a process for authenticating magnetic stripe cards in accordance with the present invention is illustrated in FIG. 13. The process 1300 involves constructing (1302) a reference image of a portion of the magnetic field intensity of the magnetic stripe and creating (1304) a comparison image of a portion of the magnetic field of the magnetic stripe. The images are then compared (1306). A decision (1308) concerning the similarity of the two images is made. If a determination is made that the portions are similar, then the process results in the conclusion that the magnetic stripe is authentic (1310). If a determination is made that the portions are dissimilar, then the conclusion is that the magnetic stripe is not authentic (1312).

Figure 14:
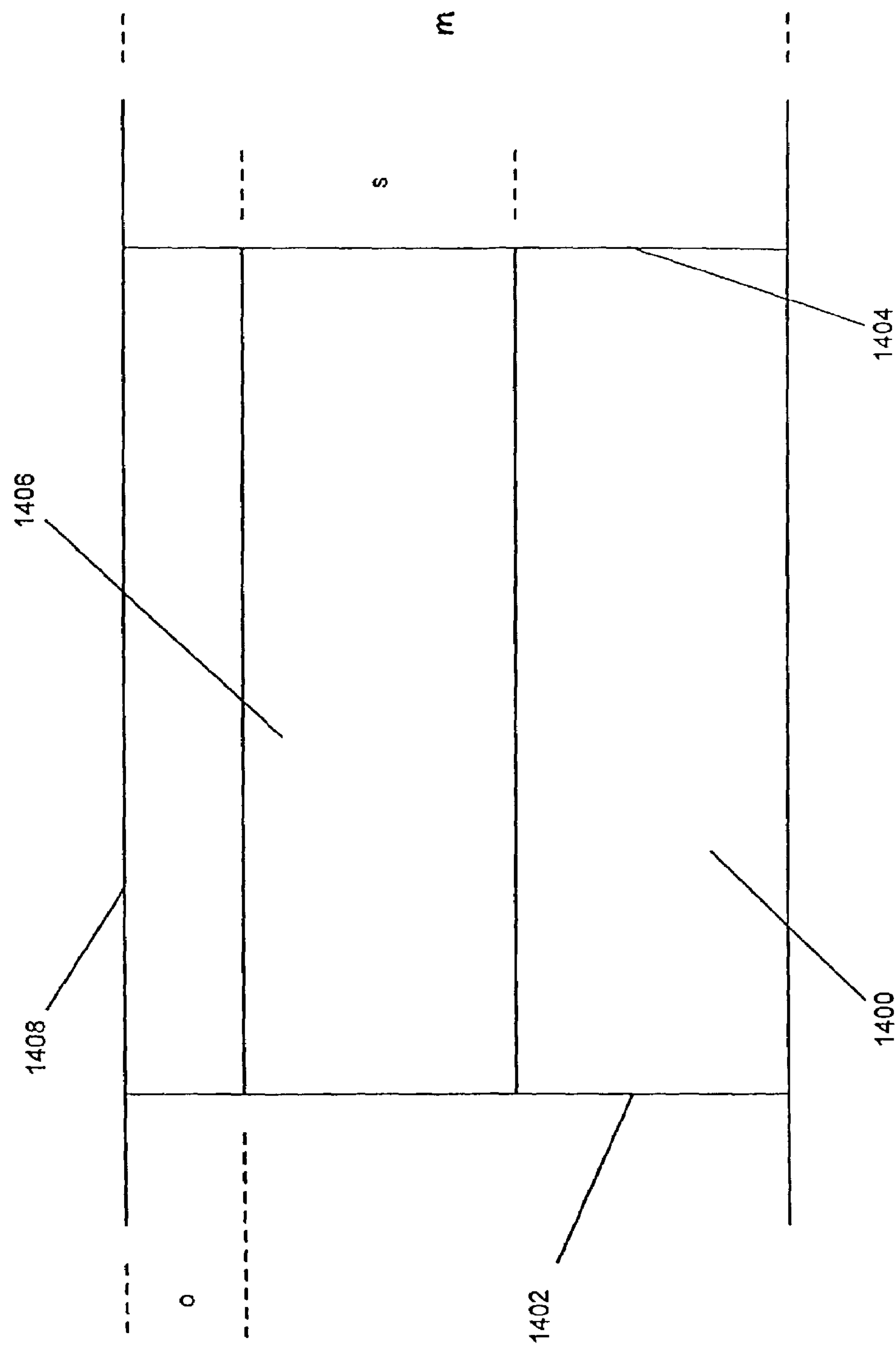
FIG. 14 is a side view schematically illustrating the portion of a magnetic track that is used for authentication in one embodiment of an authentication system in accordance with the present invention.

The portion of a magnetic track that is imaged in one preferred embodiment of the system 100 in accordance with the present invention is illustrated in FIG. 14. The magnetic track 1400 has a width m and contains a first flux transition 1402 and a second flux transition 1404. The relatively flat portion of the magnetic track that is imaged for authentication 1406 extends between the two magnetic flux transitions 1402 and 1404, has a width s and is offset a distance o from the edge 1408 of the magnetic track.

In a preferred embodiment, the magnetic track is compliant with ISO Standard 07811-6 and has a width m of 0.1 inches. In addition, the width s of the portion of the magnetic track used for authentication is 0.04 inches and the offset o of the portion from the edge 1408 of the magnetic track is 0.01 inches. In other embodiments, other magnetic mediums and/or other techniques for writing information to the magnetic medium can be used.

Figure 15:
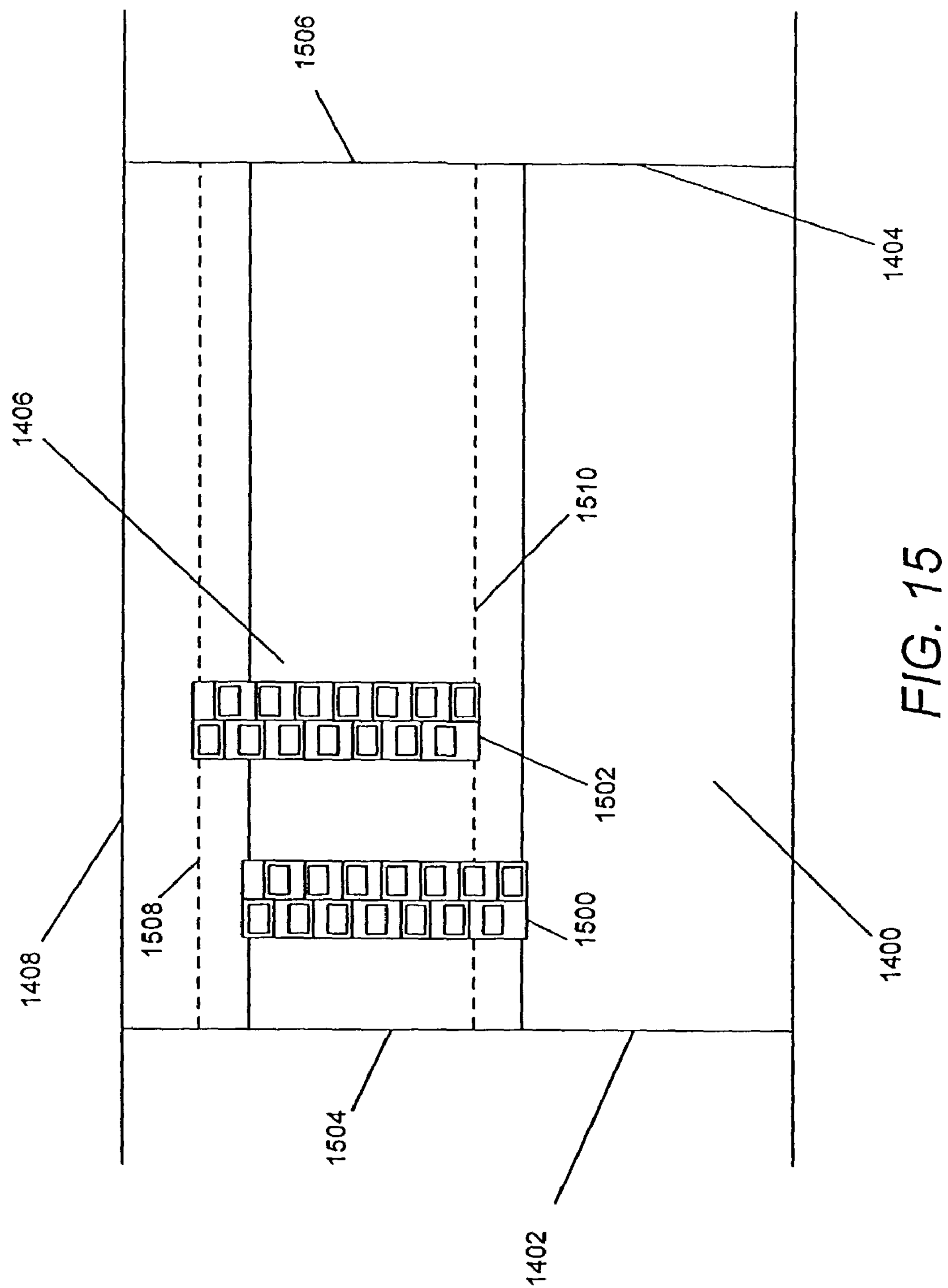
FIG. 15 is a side view schematically illustrating the effect of lateral misalignment on the area sampled by an array of magnetic reading heads.

Errors that can result due to lateral misalignment are illustrated in FIG. 15. Two arrays of magnetic reading heads 1500 and 1502 are illustrated in FIG. 15. Both are mounted without azimuth error. The first magnetic reading head 1500 is mounted so that the entire portion 1406 is sampled by the array of magnetic reading heads as it moves from the edge 1504 of the portion of the magnetic field to the edge 1506. The second magnetic reading head 1502 is mounted with a lateral offset relative to the first magnetic reading head. Due to the lateral offset, the area sampled by the magnetic reading head as it moves from the edge 1504 of the portion of the magnetic field to the edge 1506 is bounded by the lines 1508 and 1510. The area sampled by the second magnetic reading head is not the same as the portion of the magnetic field used for authentication. Therefore, a system with an array of magnetic reading heads that has a significant lateral offset or misalignment cannot generate a comparison image suitable for authenticating a magnetic stripe card.

Lateral misalignment can be accommodated by using extra magnetic reading heads in the construction of the array of magnetic reading heads. By adding additional heads, the array of magnetic reading heads can sweep across a broader area, which is more likely to include the portion of the magnetic reading head used in authentication. Increasing the width of the area swept by the array of magnetic reading heads necessitates that the system be able to identify, which samples correspond to the portion of the magnetic field used for authentication. The samples corresponding the portion of the magnetic field used for authentication can be identified using known characteristics of the magnetic field. In one embodiment, the array of magnetic reading heads contains sufficient heads to tolerate lateral misalignment and to enable the edge of the track to be detected at the same time as the portion of the magnetic stripe used for authentication is being sampled. In addition, edge detection algorithms are used to detect the edge of the track and the magnetic flux transitions. Once, the edge of the track is found, the portion or portions of the magnetic field used for authentication is located using the known offsets of the portion or portions relative to the edge of the track and the magnetic flux transitions.

In one preferred embodiment of the system 10 used for the authentication of magnetic stripe cards, the array of magnetic reading heads is a staggered array consisting of 110 magneto-resistive magnetic reading heads. Each reading head has an aperture width w of 0.0005 inches and a height h of 0.001 inches. The array sweeps an area with a lateral height of 0.11 inches. This height is sufficient to accommodate 0.03 inches of track location uncertainty, 0.01 inches of lift-up allowance with an additional 0.01 inches of tolerance for other factors. The lateral height of the array is also sufficient to provide these tolerances and to provide enough sensors to detect the edge of the magnetic track and sweep an area with a lateral height of 0.04 inches that is offset a distance of 0.01 inches from the edge of the magnetic track. In addition, the system possesses a 16-bit AID converter. The strength of the magnetic field in the portion of the magnetic field used for authentication is approximately 1% to 3% of the peak magnetic field intensity. In lower tolerance applications, an A/D converter with as few as 8 output bits could be used. The number of bits required can also be reduced by using a pre-amplifier with automatic gain control or companding. In other embodiments, a larger number of quantization levels can be used in the A/D converter. However, beyond a certain level system noise will dominate and accuracy will not be improved.

When the preferred embodiment described above is used to authenticate the portion of the magnetic stripe that has a magnetic field intensity illustrated as 1406 in FIG. 14, the array of magnetic reading heads moves relative to the magnetic stripe. The signal processing block controls the sampling block to ensure that 256 samples are taken between the magnetic field intensity peaks 1402 and 1404. The sampling block corrects for the offsets in the output generated by the sampling block that result from the staggering of the array of magnetic reading heads and from the sequential sampling of the magnetic reading heads. Once these offsets have been eliminated, the signal processing block detects characteristic features of the magnetic image such as the magnetic field intensity peaks 1402 and 1404 and the edge of the magnetic track 1408. These characteristic features are used to locate the samples corresponding to the edge of the track and the samples corresponding to the portion of the magnetic field offset a distance of 0.01 inches from the edge of the track and having a width of 0.04 inches.

The characteristic features of the magnetic field intensity can also be used to correct for azimuth misalignment. In one preferred embodiment, the azimuth misalignment is detected by looking for the peak value in each row of 'mixels', which corresponds to the flux transitions. The positions of the peak value in each row determines the relative offset between the rows resulting from the azimuth misalignment. These offsets are then corrected to generate new columns of 'mixels' used to form the final image. In this embodiment, determining the relative offsets of the rows is sufficient to correct for an azimuth error of approximately 60. A greater azimuth error can be tolerated by using smaller magnetic reading heads to increase the 'mixel' density of the image generated by the system. A greater azimuth error can also be tolerated by estimating the azimuth misalignment and using signal processing algorithms to correct for the errors that would be introduced by the estimated amount of azimuth misalignment, as described above. In other embodiments, the azimuth misalignment is detected by locating the edge of the magnetic stripe 1408 instead of using the magnetic field intensity peaks 1402 and 1404.

Once the reference image and the comparison image have been generated, one embodiment of the system 100 in accordance with the present invention determines the authenticity of the magnetic stripe card by comparing corresponding columns of 'mixels' in the two images. In one embodiment, the columns are compared by summing the values in each of the 'mixels' in the column and comparing the result for each image. The extent of the correlation between the two images can be detected by only selecting a small number of sparsely separated columns. In one embodiment, the number of columns selected is four. Using the preferred embodiment of the system 100 described above, an authentication process involving the comparison of four sparsely separated columns generates a correlation in the approximate range of 0.90–0.96 for authentic magnetic stripe cards and generates a correlation in the approximate range of 0.3–0.35 for counterfeit magnetic stripe cards. The system has a tolerance for lateral misalignments of up to 0.01 inches and for azimuth misalignments of up to 60. The advantage of using sparsely spaced columns to perform the authentication test is that a very small amount of data is required. If the authentication test is performed at a site remote from the system 100, the overall system response time and cost is improved by only sending a small amount of data between the system 100 and the remote site and not the entire image. In other embodiments, the images can be compared on a pixel by pixel basis and/or using other statistical metrics.

Figure 16:
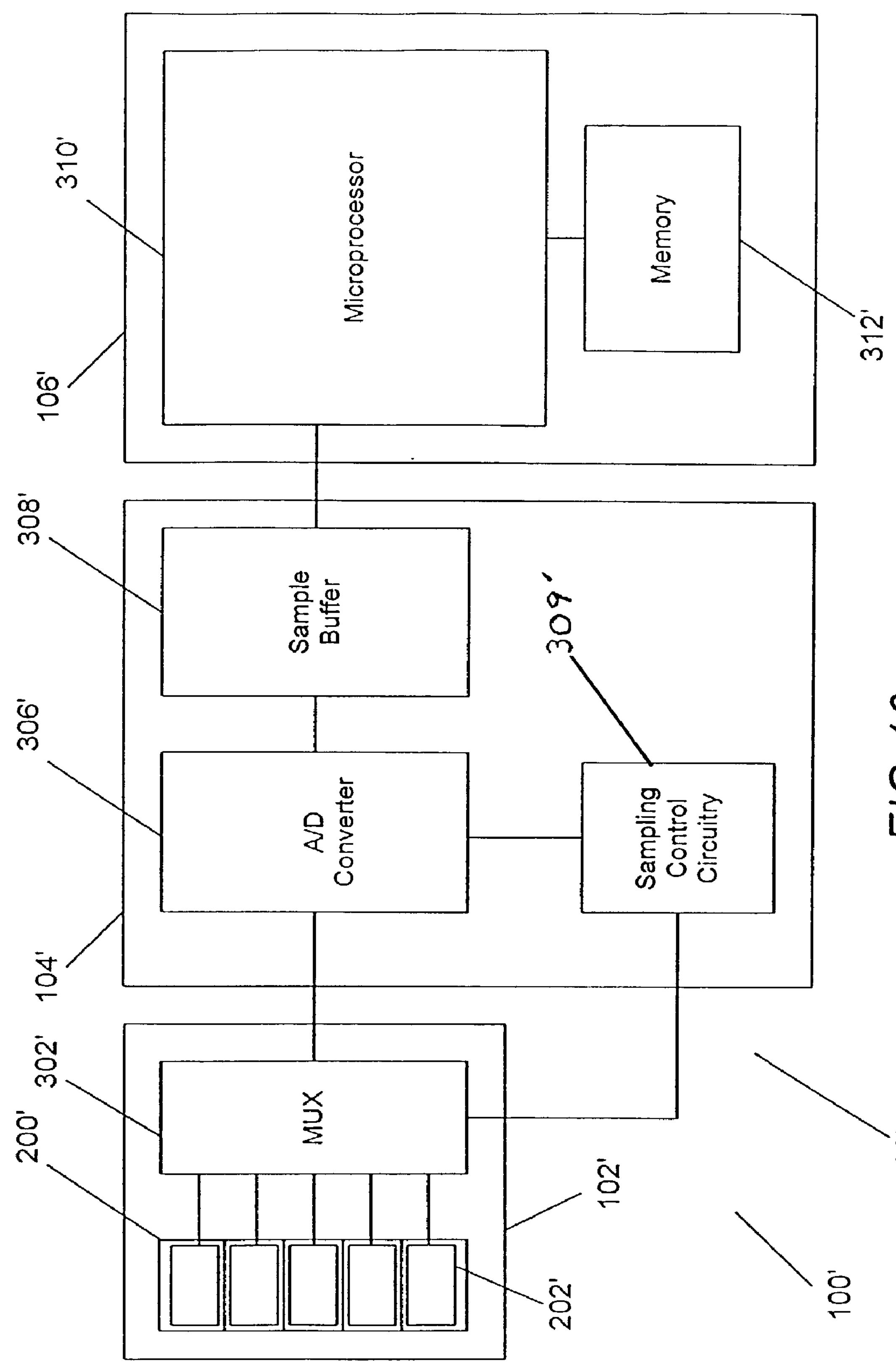
FIG. 16 is a circuit diagram schematically illustrating a magnetic imaging system having an array of inductive reading heads.

Another embodiment of the system in accordance with the present invention utilizing inductive magnetic reading heads is illustrated in FIG. 16. The system 100' illustrated in FIG. 16 is almost identical to the system 100 illustrated in FIG. 3 except that a current source is not connected to the magnetic reading heads. The reason a current source is not required is that the inductive reading heads are passive elements and do not require driving current from the sampling control circuitry to generate an output.

Figure 17:
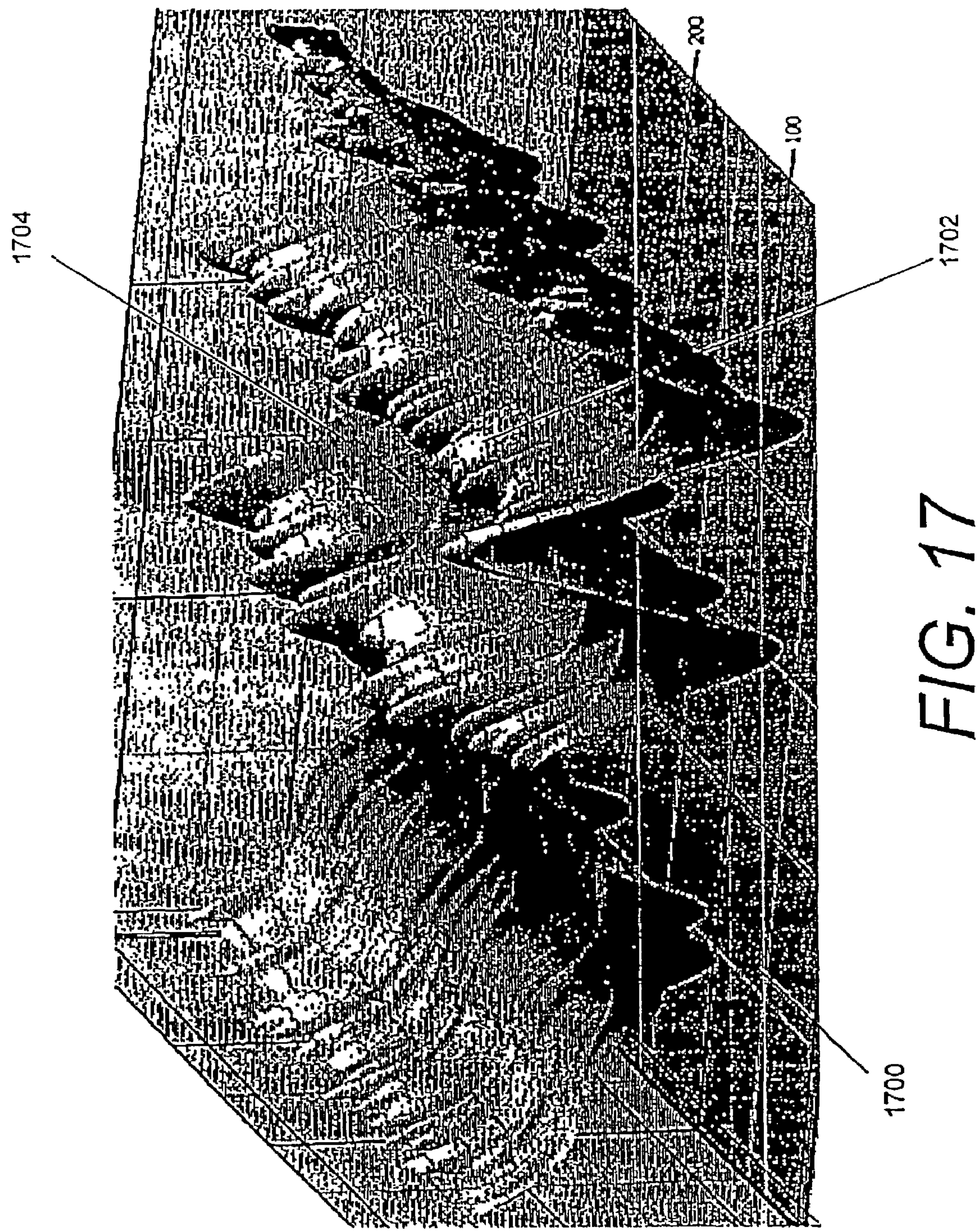
FIG. 17 is an elevation view schematically illustrating the magnetic field intensity of a portion of a track of magnetic data recorded with a density of 1016 bits per inch.

In other embodiments, a higher bit rate can be used to record information in a magnetic field. A magnetic field intensity of a portion of a magnetic stripe containing data recorded at a bit rate of 1016 bits per inch is illustrated in FIG. 17. The magnetic field intensity 1700 includes peak magnetic field intensity regions 1702 that correspond to magnetic flux transitions and regions located between the peaks in magnetic field intensity 1704. Due to the high bit rate of the data, the regions located between the peaks 1704 do not contain a relatively flat portion similar to the relatively flat portion 1206 of the lower bit rate magnetic field 1200 illustrated in FIG. 12. Magnetic materials used in the construction of magnetic stripes generally have an inherent grain that results in an uneven distribution of magnetic material. When a magnetic peak is recorded onto a magnetic stripe, the uneven distribution of the magnetic materials in the magnetic stripe results in significant variation in the localized magnetic field along the lateral ridge 1208 of the magnetic field intensity peak. The lateral variation can be of the order of 1000 features per inch. At magnetic field intensity peaks, the lateral ridges 1208 can have magnitude variations that are greater than the longitudinal magnitude variations observed in the relatively flat portion 1206 illustrated in FIG. 12. Therefore, the variation in magnetic field intensity of lateral ridges of magnetic field intensity peaks can be effectively used to authenticate magnetic stripe cards irrespective of the bit rate of the data stored on the magnetic stripe.

Figure 18:
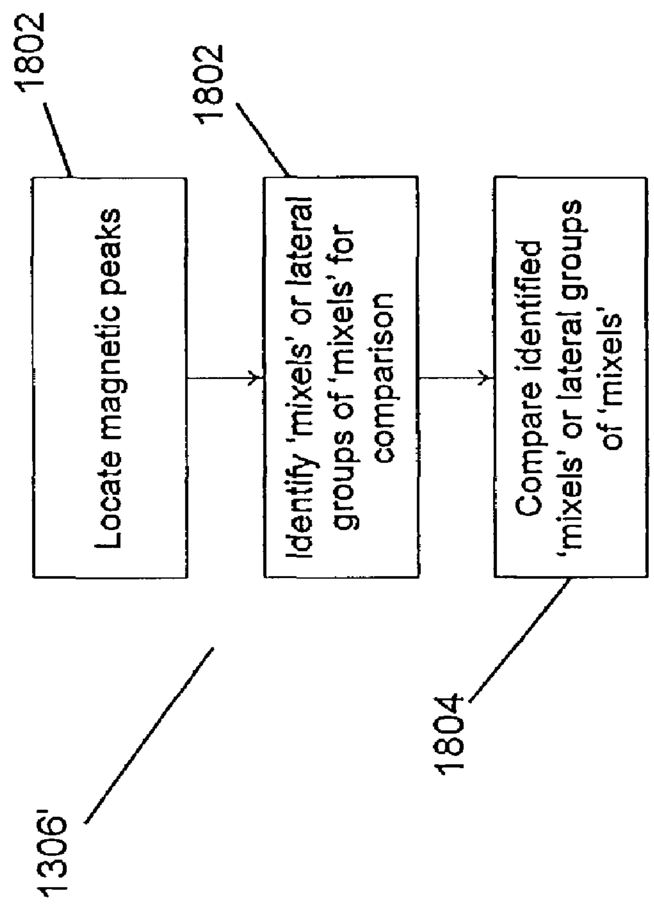
FIG. 18 is a block diagram schematically illustrating a process for comparing a reference and a comparison image.

The systems and methods described above in accordance with the present invention can be used to generate reference and comparison images of a magnetic field recorded onto a magnetic stripe. One preferred embodiment of a method for comparing reference and comparison images of magnetic stripes using intensity variations along the lateral ridges of magnetic field intensity peaks of data recorded on a magnetic stripe is illustrated in FIG. 18. The process 1306' is a process that can be used to compare images in instances such as the process 1300 illustrated in FIG. 13. The process 1306' involves locating (1800) the magnetic peaks in the reference and comparison images. In one embodiment, magnetic peaks in the reference and comparison images are located using edge detection algorithms. In other embodiments, any of the methods described above can be used to locate magnetic peaks in the reference and comparison images. Once the magnetic peaks have been located, individual 'mixels' or lateral groups of 'mixels' are identified (1802) within the magnetic peaks. The identified 'mixels' or lateral groups of 'mixels' are used to compare (1804) the similarity of the reference and comparison images. In one preferred embodiment, the correlation of the identified 'mixels' or lateral groups of 'mixels' is used to compare the similarity of the reference and comparison images. In other embodiments, other metrics can be used to compare the similarity of the reference and comparison images.

In the process described above, the larger the number of 'mixels' in the indentified lateral groups of 'mixels', the greater the tolerance of the system for magnetic reading head misalignments. In addition, increasing the number of identified 'mixels' or lateral groups of mixels used in performing a comparison between a reference image and a comparison image can result in more accurate identification of authentic magnetic stripes. In one embodiment, 4 laterally adjacent groups of 10 'mixels' from predetermined locations in 12 magnetic peaks in a magnetic stripe are used to perform a comparison. The use of 4 laterally adjacent groups of 10 'mixels' enables the system to tolerate a lateral misalignment of ±1 'mixel'. Similar methods and apparatus to those described above can be used to correct azimuth errors.

Taking 48 total samples from 12 peaks of the magnetic field provides a correlation between a reference image and an authentic magnetic stripe of greater than 0.9 under laboratory conditions and greater than 0.8 under production conditions. The same system is able to identify a counterfeit magnetic stripe, when a correlation of less than 0.5 is generated between the reference and comparison images.

In other embodiments, at least one 'mixel' from each of the magnetic peaks is used in the authentication of magnetic stripe cards. In other embodiments, sufficient 'mixels' to image the entire lateral ridge of a magnetic field intensity peak can be used in the authentication of magnetic stripe cards.

In other embodiments, 'mixels' from at least one magnetic peak are used in the authentication of magnetic stripe cards. Preferably, 'mixels' taken from between 10 and 15 magnetic peaks are used in the authentication of magnetic stripe cards.

The embodiments described above use a variety of signal processing techniques to locate features and/or extract information from images of magnetic fields. These techniques rely on storage and processing of an image of the magnetic field. In magnetic fingerprinting applications, the most important 'mixels' are the 'mixels' that constitute the fingerprint. The techniques described above use digital signal processing techniques to extract fingerprint 'mixels' from an image that is known to contain the fingerprint. In other embodiments, techniques can be used to reduce the amount of data initially collected and the signal processing required for extracting the fingerprint information from the collected data. In one embodiment, the magnetic fingerprint is chosen to be the magnetic field of specific portions of a readily discernable feature within the magnetic field such as a peak. The magnetic field can then be fingerprinted by monitoring the output of the magnetic reading head array to detect the feature and then imaging the feature. This approach reduces the amount of signal processing and storage required for locating the fingerprint and can compensate for azimuth misalignments and 'sub-mixel' offsets. Apparatus and methods for locating peaks and then taking an image along the lateral ridge of the peak in a manner that can compensate for azimuth misalignments and 'sub-mixel' offsets are discussed below.

Figure 19:
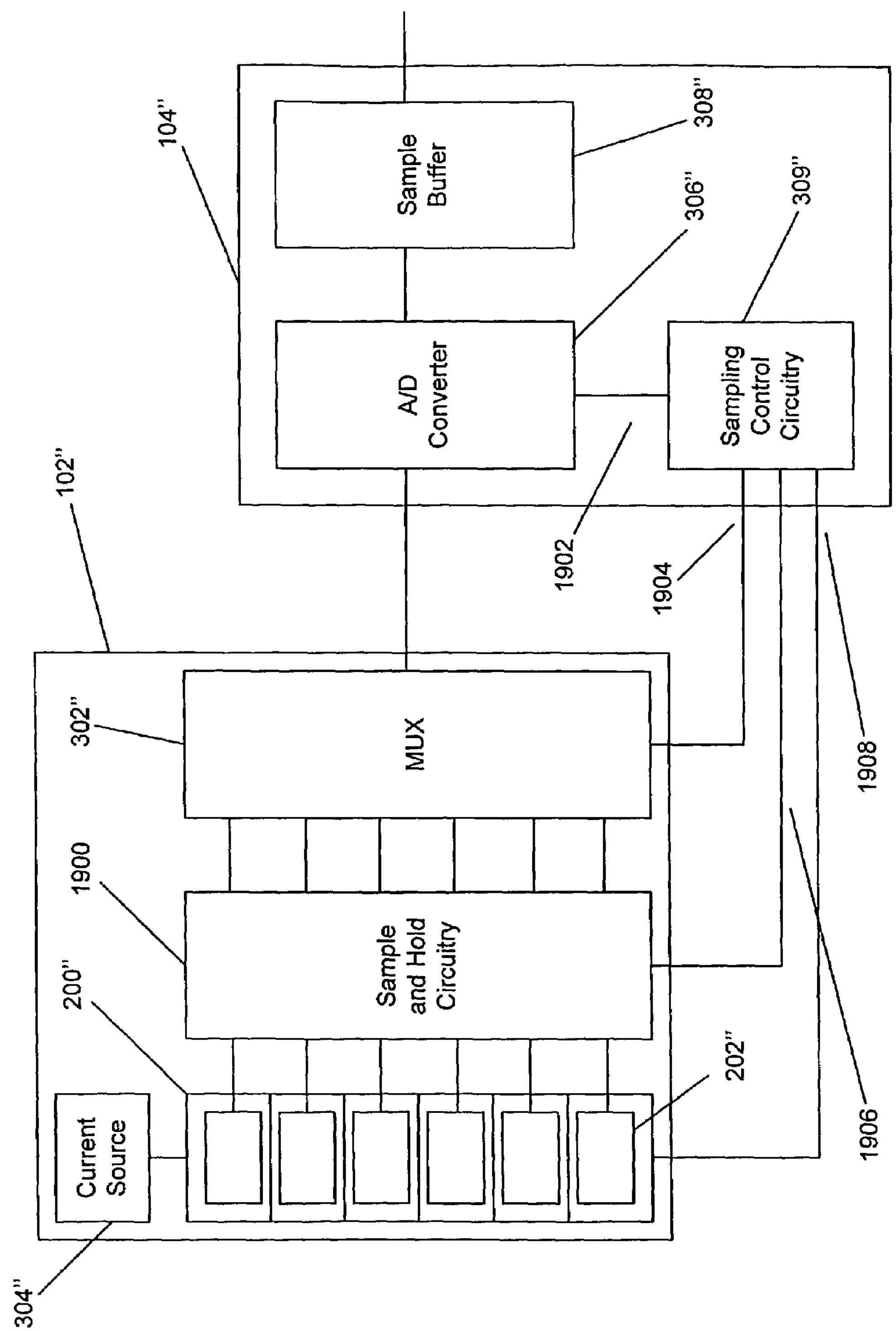
FIG. 19 is a block diagram schematically illustrating a magnetic imaging system that has sample and hold circuitry for detecting peaks in the outputs of an array of magnetic reading heads.

A sensing block and a sampling block of a system for detecting and imaging peaks in a magnetic field are illustrated in FIG. 19. The sensing block 102" includes an array of magnetic reading heads 200" that is connected to a current source 304", sample and hold circuitry 1900 and sampling control circuitry 309", which form part of the sampling block 104". The current source provides current to the array of magnetic reading heads, which in turn provides output signals to the sample and hold circuitry. The sample and hold circuitry receives signals from the magnetic reading head array and detects and samples peaks in these signals. The samples are provided to a multiplexer 302" via connections between the sample and hold circuitry and the multiplexer. The multiplexer can be located within the sensing block and performs the function of selecting one of the outputs from the sample and hold circuitry and providing the selected output signal to an analog to digital converter 306". The output selected by the multiplexer is controlled by a connection 1904 between the sampling control circuitry and the multiplexer. The analog to digital converter is located within the sampling block and is responsible for converting signals received from the multiplexer into digital signals. The digital signals are then provided to a sample buffer 308", where they are stored temporarily for access by other components.

The sample and hold circuitry is responsible for coordinating the operation of the various components in the sensing block 102" and the sampling block 104". As the array of magnetic reading heads moves relative to a magnetic field, the sampling control circuitry can control the rate at which individual reading heads in the array of magnetic reading heads are sampled. The sampling control circuitry can also reset the sample and hold circuitry, control which signal is provided to the analog to digital converter by the multiplexer and can ensure that the analog to digital converter only samples when an appropriate signal is being provided by the multiplexer.

Figure 20:
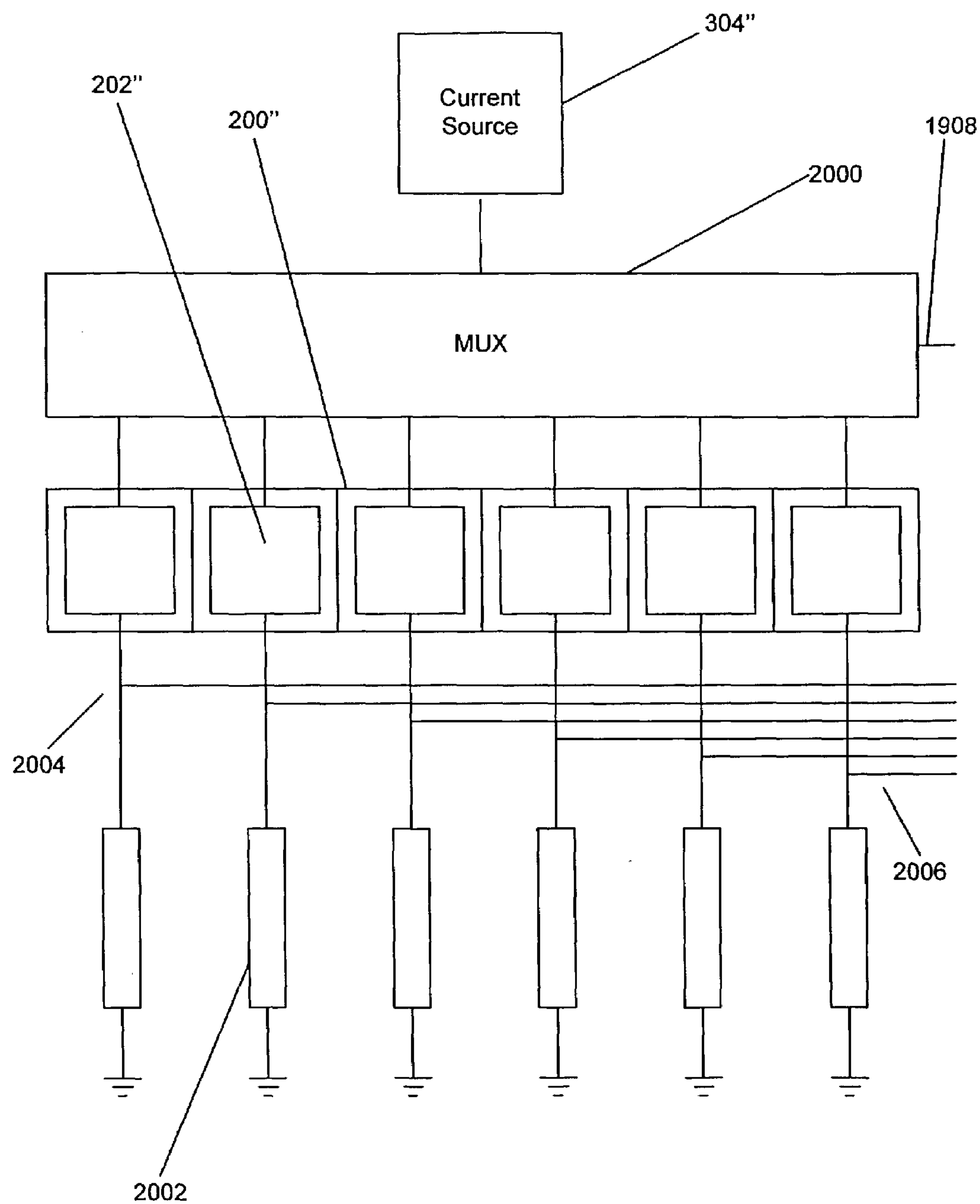
FIG. 20 is a block diagram schematically illustrating an array of magnetic reading heads and circuitry for selectively activating each of the magnetic reading heads in the array.

A magnetic reading head array and circuitry to provide current sequentially to the magnetic reading heads in an array of magnetic reading heads is shown in FIG. 20. The array of magnetic reading heads 200" includes a number of magneto-resistive reading heads 202". Current is provided to the magneto-resistive reading heads by a current source 304". The reading heads are sequentially activated using a multiplexer 2000. The sequencing of the reading heads is controlled using an input 1900 to the multiplexer from the sampling control circuitry (not shown). Each reading head forms a voltage divider with a resistor 2002 and the voltage at the junction 2004 between the reading head and the resistor is provided as an output 2006.

The configuration illustrated in FIG. 20 can be implemented in silicon or using discrete components. Sequentially enabling the magnetic reading heads conserves power, however, other embodiments can use a separate current source for each reading head. Motion of the array of magnetic reading heads shown in FIG. 20 relative to a magnetic field results in signals from the outputs of the magnetic reading heads that vary according to the magnetic field within the aperture of the reading head during the periods in which the magnetic reading head is enabled. When a magnetic reading head is not enabled, its output will be independent of the magnetic field within the reading head aperture. A peak in a magnetic field will appear as a peak in the output of a magnetic reading head, provided the reading head is enabled. Therefore, the signals from the sampling control circuitry should sequentially enable the magnetic reading heads at a rate in excess of the Nyquist rate to ensure no information is lost during the periods in which individual reading heads are not enabled.

Figure 21:
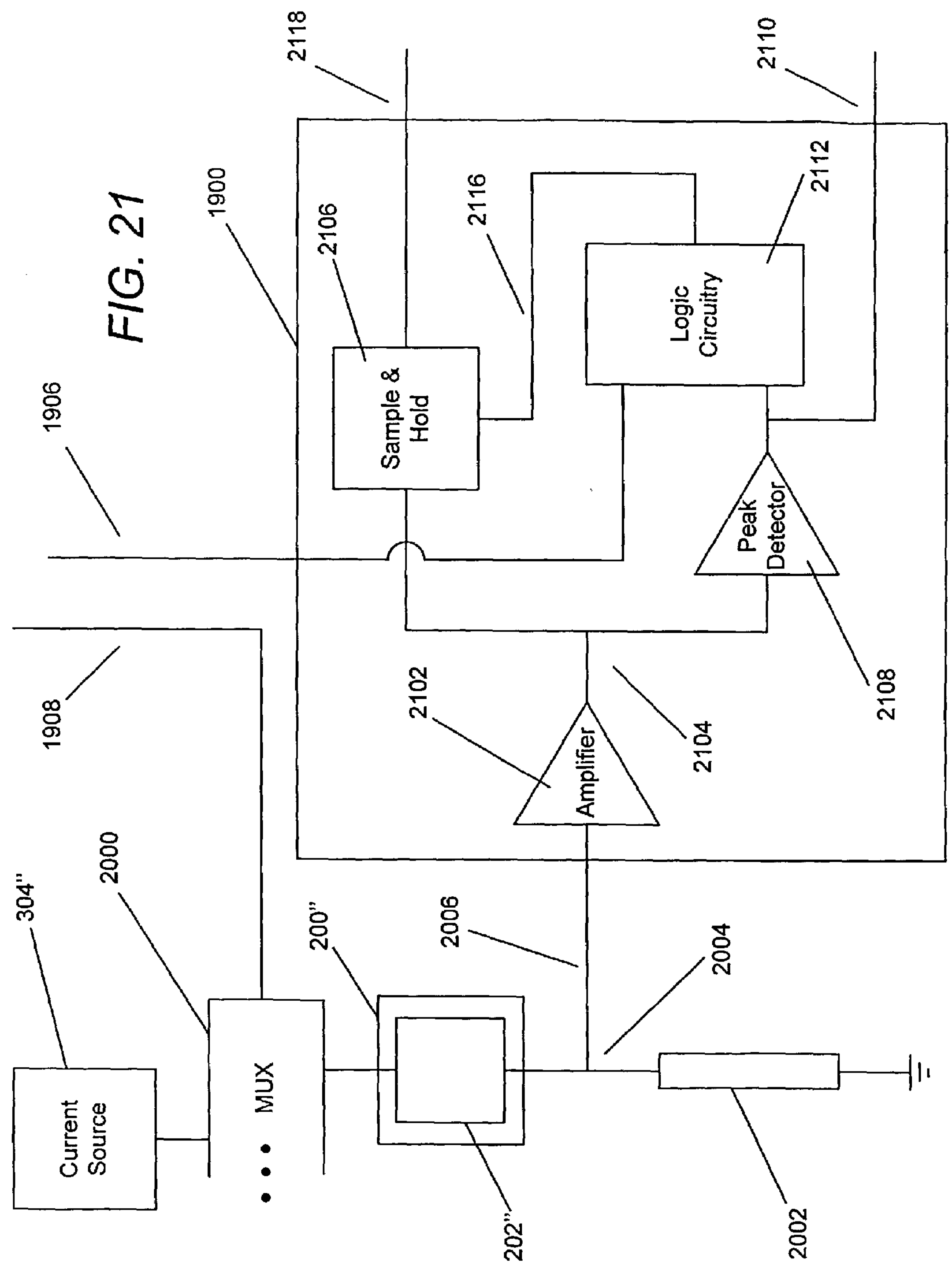
FIG. 21 is a block diagram schematically illustrating sample and hold circuitry for sampling a peak in the output of a magnetic reading head.

Sample and hold circuitry used in conjunction with a magnetic reading head to sample the peak output of the magnetic reading head is shown in FIG. 21. The output 2006 of the magnetic reading head 200" is provided to the sample and hold circuitry 1900. The output signal is initially amplified by an amplifier 2102 and the amplified signal is provided to a sample and hold circuit 2106 and to a peak detector 2108. As described above, the purpose of the sample and hold circuitry 1900 is to detect peaks in the output of the magnetic reading head and then to sample the peak output value. The peak detector performs the function of detecting peaks in the magnetic reading head output and provides a signal 2110 to logic circuitry 2112, which coordinates the function of sampling the magnetic reading head output performed by the sample and hold circuit. The peak detector output 2110 can also be provided to other circuitry for the purposes of decoding data encoded as peaks in the magnetic field. In other embodiments, the peak detector circuit is amplitude qualified to prevent noise from being mistaken for a peak.

The logic circuitry 2112 receives inputs from the peak detector and from the sampling control circuitry (not shown). The input 2110 from the peak detector indicates a peak in the output of the magnetic reading head and the input from the sampling control circuitry indicates whether the magnetic reading head was enabled when the peak occurred. If a peak is detected when the magnetic reading head is enabled, then the logic circuitry generates a signal on the output 2116. The sample and hold circuit responds to this signal by sampling the amplified signal and providing the sample on the output 2118. In other embodiments, signals provided to the logic circuitry by the sampling control circuitry are also used to release the sample and hold circuit enabling samples to be taken from multiple peaks.

Figure 22:
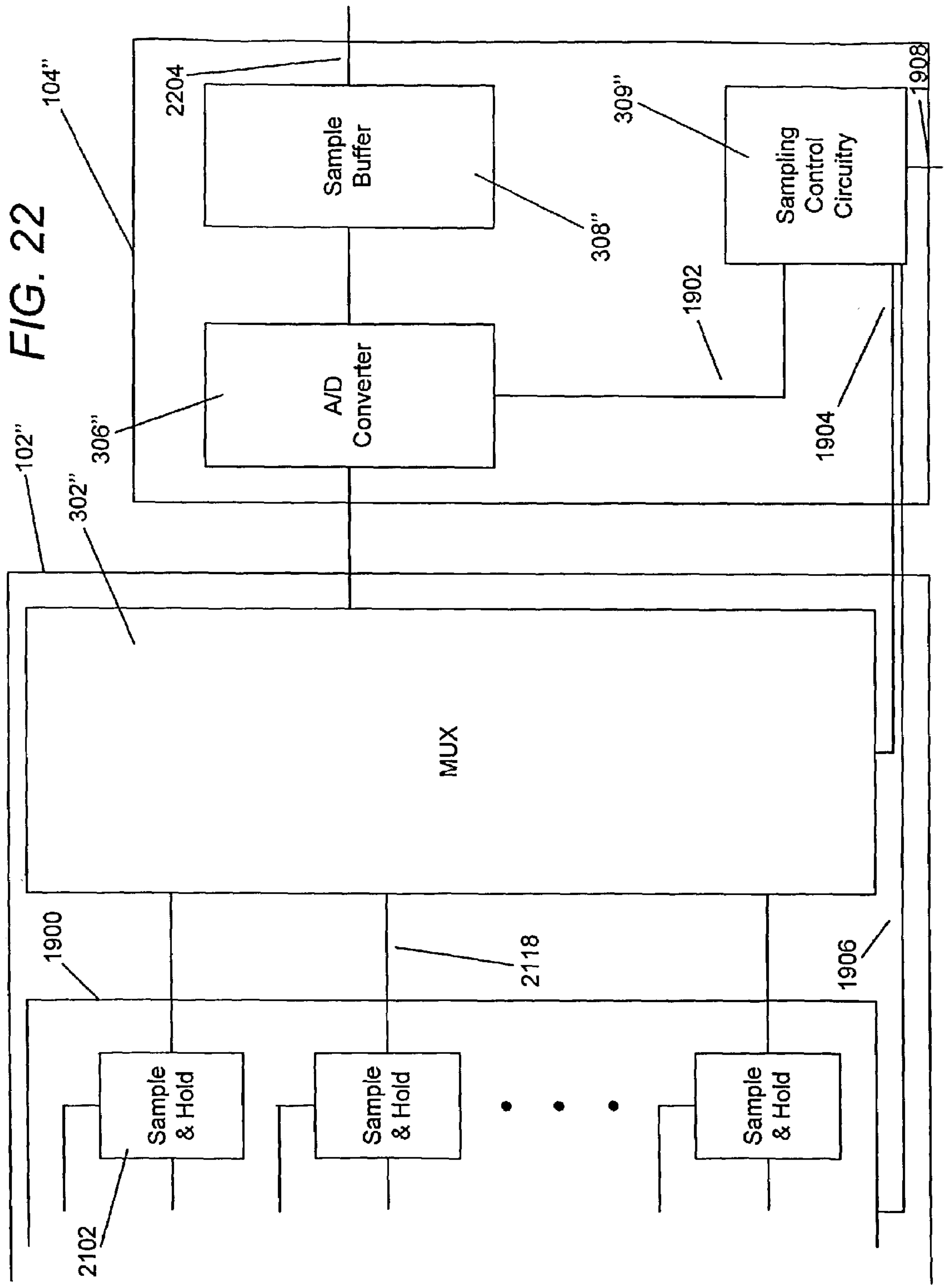
FIG. 22 is a block diagram schematically illustrating the use of a multiplexer and an analog to digital converter to convert the output of sample and hold circuitry into a digital signal.

Circuitry for converting the outputs of the sample and hold circuits to digital signals is shown in FIG. 22. The outputs 2118 of the sample and hold circuits 2102 are provided to a multiplexer 302", which provides an output selected by the sampling control circuitry 309" to the analog to digital converter 306" in the manner outlined above.

Figure 23:
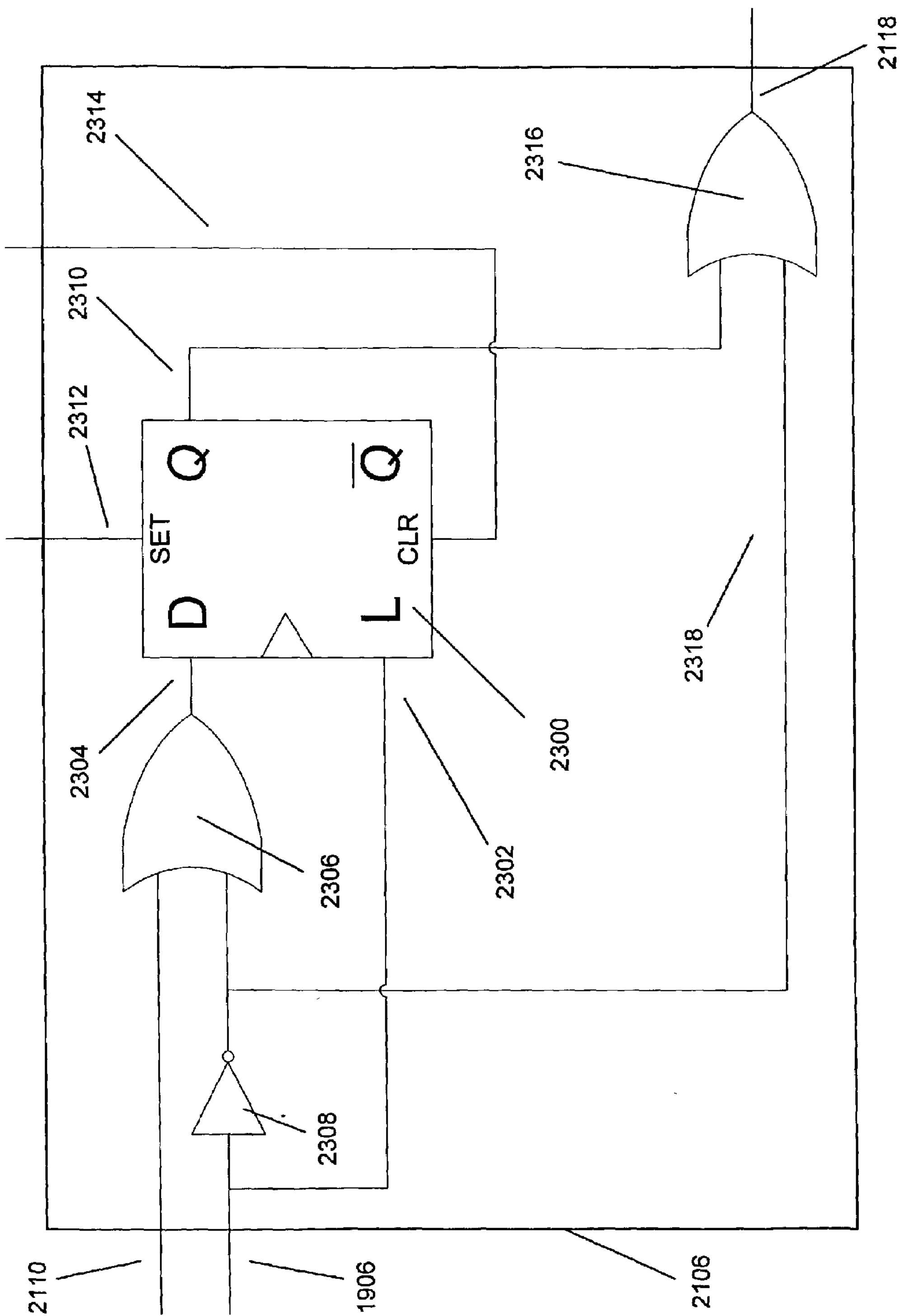
FIG. 23 is a block diagram schematically illustrating circuitry for generating a signal to sample and hold the output of a magnetic reading head in response to the detection of a peak in that output.

An embodiment of circuitry that can be used to implement the logic circuitry 2106 of FIG. 21 is shown in FIG. 23. As described above, the logic circuitry 2106 receives an input 2110 from the peak detector and an input 1906 from the sampling control circuitry and the logic circuitry generates an output 2118 indicating whether the magnetic reading head output should be sampled. In the illustrated embodiment, the logic circuitry is implemented using a latched D-type flip flop 2300. The input 1906 is provided directly to the latch 2302 of the D-type flip flop, which means that the flip flop only responds to changes in the signal at the data input 2304 of the flip flop when the magnetic reading head is enabled. The input to the data input 2304 of the flip flop is provided by an OR gate 2306, the inputs of which are the output of the peak detector 2110 and the inverted input 1906 of the sampling control circuitry. The input 1906 of the sampling control circuitry is inverted by the NOT gate 2308. Connecting these inputs to the OR gate provides a signal to the data input of the data flip flop that is a logic 1 when a peak is detected and the magnetic reading head is enabled. The combination of the inputs to the latch and the data input of the flip flop result in the Q output 2310 of the flip flop being a logic 1 from the time at which a peak is first detected when the magnetic reading head is enabled until the time the flip flop is cleared or the peak detector is reset. A pair of inputs 2312 and 2314 are connected to the flip flop and provide signals that set the initial output from the flip flop and clear the flip flop once a peak has been detected.

The output 2310 of the D-type flip flop is provided to an OR gate 2316, which also receives as input the output 2318 of the inverter 2308. The combination of these two inputs provides the logic circuitry output 2118, which indicates that the sample and hold circuitry should sample the magnetic reading head output when a peak is detected and the reading head was enabled or at the end of the period in which the magnetic reading head was enabled when a peak has not been detected. Sampling the output of the reading head at the end of the period in which it was enabled, despite the absence of a peak, provides a signal that can be used to perform edge detection. When the array of magnetic reading heads is positioned at the edge of a magnetic medium so that some of the magnetic reading heads are located over the magnetic medium and others are not, then a peak in the output of some of the magnetic reading heads and a comparatively small signal in the output of other magnetic reading heads can be used to identify the location of the edge of the magnetic field. In applications involving the location of a magnetic fingerprint, information concerning the edge of the magnetic field can identify 'mixels' forming part of the fingerprint.

Figure 24:
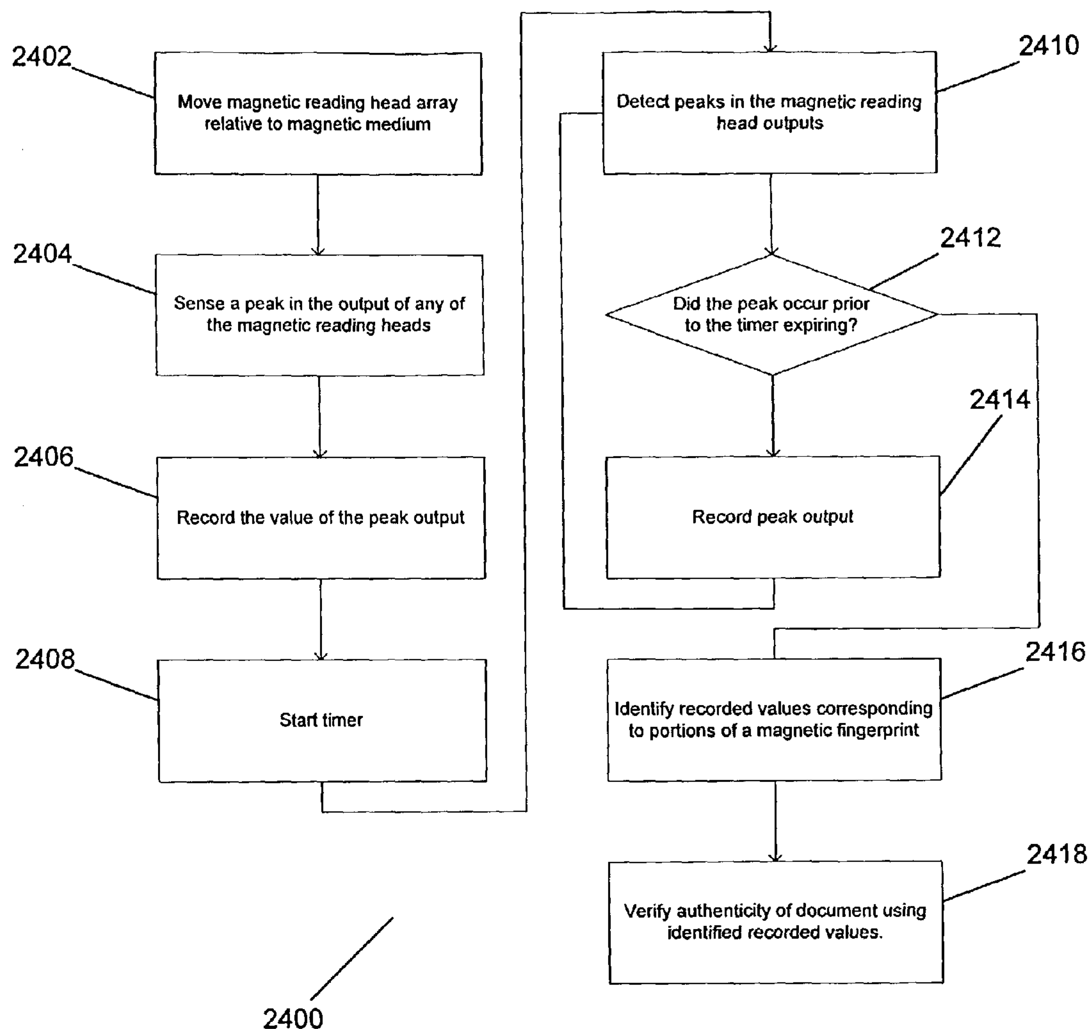
FIG. 24 is a block diagram schematically illustrating a process for verifying the authenticity of a document using a magnetic fingerprint that includes the magnetic field of a portion of a magnetic flux transition.

A process for verifying the authenticity of a document having a magnetic medium with a peak in the magnetic field of the magnetic medium and a magnetic fingerprint corresponding to the magnetic field in specified regions along the peak is shown in FIG. 24. The process 2400 involves moving (2402) a magnetic reading head array relative to the magnetic medium while attempting to sense (2404) a peak in the output of any of the magnetic reading heads. The value of the first peak sensed is recorded (2404) and the occurrence of the first peak results in a timer being set (2408). Peaks detected (2410) in the output of other magnetic reading heads prior to the expiration of the timer (2412) are also recorded (2414). The expiration of the timer indicates the completion of data gathering and the recorded information can be inspected to identify (2416) values corresponding to portions of a magnetic fingerprint for the document. These values can then be used to verify (2418) the authenticity of the document by comparing them to the corresponding portions of the magnetic fingerprint.

The process described above can be viewed as imaging a peak in a magnetic field and extracting information relating to specific regions along the peak to verify the authenticity of a document. The same process can also be relied upon to obtain the initial values for a magnetic fingerprint that is later used to verify the authenticity of the document.

Detecting peaks in the outputs of an array of magnetic reading heads during a specified time period can correct azimuth misalignments and 'sub-mixel' offsets. The correction occurs, because samples are only taken of the peak outputs of the magnetic reading heads. By timing the sample to be taken at the peak output, the samples of the peak magnetic reading head outputs correspond to the magnetic field along the magnetic peak. Therefore, using the magnetic field along a peak or at specific locations along the peak as a magnetic fingerprint enables the above techniques that automatically compensate for azimuth misalignments and 'sub-mixel' offsets to be used to measure or image the magnetic field along the peak and locate the fingerprint.

In the embodiments illustrated in FIGS. 19–23, the sampling control circuitry 309" performs several functions. One function involves controlling the sampling of the peak outputs of the reading heads, which involves the monitoring of the sample and hold circuitry to determine when a peak has been sampled, operating the multiplexer to provide the samples of the peak to the analog to digital converter, coordinating the loading of the digital data into the buffer and then resetting the sample and hold circuitry to acquire the next peak. An embodiment of the sampling control circuitry is a state machine that performs the function of controlling the sampling of the peak outputs, which is implemented in a manner well known in the art using flip flops and digital logic. Another function that is performed by the sampling control circuitry is the sequencing of the magnetic reading heads. In one embodiment, the sampling control circuitry includes an oscillator and flip flops in combination with digital logic circuitry to generate the appropriate output signals to the sensing block. In other embodiments, a microprocessor, discrete components, ASICs or a combination of the above can be used to implement the sampling control circuitry.

In one embodiment of a system 100 in accordance with the present invention, images of the entire magnetic stripe are used as the reference and comparison images. In other embodiments, discrete portions of the magnetic stripe are located using the characteristics of the magnetic field intensity and images of the located discrete portions are used to create the reference and comparison images.

In addition to use of the system 100 in accordance with the present invention in the authentication of magnetic stripe cards. Embodiments of the system 100 can also be used in the authentication of tickets, documents or objects that contain information recorded in a magnetic medium.

While the above description contains many specific embodiments of the invention, these should not be construed as limitations on the scope of the invention, but rather as an example of one embodiment thereof. Many other variations are possible. Accordingly, the scope of the invention should be determined not by the embodiments illustrated, but by the appended claims and their equivalents.

What is claimed:

1. A method of imaging a magnetic field, comprising:

positioning an array of magnetic reading heads over a first portion of the magnetic field;

sampling each of the magnetic reading heads in the array of magnetic reading heads;

repositioning the array of magnetic reading heads over a second portion of the magnetic field and repeatedly measuring the magnetic field until every portion of the magnetic field has been measured;

generating an image of the magnetic field using the measurements;

correcting any offsets introduced by staggering of the magnetic reading heads in the array of magnetic reading heads, sequential sampling and/or motion of the array of magnetic reading heads during sampling; and correcting any azimuth misalignment of the array of magnetic reading heads.

2. The method of claim 1, wherein correcting any offsets introduced by staggering of the magnetic reading heads in the array of magnetic reading heads, sequential sampling and/or motion of the array of magnetic reading heads during sampling, further comprises generating a new image using a weighted average to correct the offsets.

3. A system for authenticating a magnetic stripe card comprising a track of magnetic data having a magnetic field, the system comprising:

sensing circuitry for sensing an image of at least a portion of the magnetic field using an array of magnetic reading heads;

sampling circuitry connected to the sensing circuitry; and signal processing circuitry connected to the sampling circuitry;

wherein the magnetic reading heads in the array of magnetic reading heads are rectangular with an upper longitudinal edge and a lower longitudinal edge; and wherein the magnetic reading heads in the array of magnetic reading heads are staggered so that the upper longitudinal edge of a first magnetic reading head is aligned with the lower longitudinal edge of a second magnetic reading head.

4. A secure transaction system, comprising:

a magnetic stripe card having a magnetic field with known characteristics;

sensing circuitry that generates a first signal indicative of the intensity of a portion of the magnetic field;

sampling circuitry connected to the sensing circuitry that measures the first signal and generates a second signal indicative of the measurement of the first signal; and signal processing circuitry connected to the sampling circuitry that uses the second signal to construct an image of the magnetic field in at least two dimensions;

wherein the signal processing circuitry is able to substantially identify the known characteristic features of the magnetic field; and wherein the signal processing circuitry uses the known characteristic features to correct for misalignments of the sensing circuitry.

5. The system of claim 4, wherein:

the system is adaptable to identify the authenticity of the magnetic stripe card based on the magnetic field of at least a first portion of a magnetic stripe located on the card, where the stripe a first lateral height; and the sensing circuitry includes an array of magnetic reading heads that has a lateral height greater than the first lateral height.

6. A method of authenticating a magnetic stripe card having a magnetic field with known characteristic features, comprising:

generating a reference image in at least two dimensions of at least a first portion of the magnetic field, where the first portion is in a specific location relative to the known characteristic features of the magnetic field;

generating a comparison image of the magnetic field in at least two dimensions that includes the first portion of the magnetic field;

selecting a portion of the reference image corresponding to the first portion of the magnetic field;

locating known characteristic features within the comparison image;

adjusting the image to correct for azimuth misalignment; and determining the location of the first portion of the magnetic field within the comparison image using the characteristic features of the magnetic field; and comparing the portion of the comparison image corresponding to the first portion of the magnetic field to the selected portion of the reference image corresponding to the first portion of the magnetic field.

7. The method of claim 6, wherein comparing a portion of the comparison image to the portion of the reference image further comprises:

extracting one or more columns from the reference image;

extracting columns from the comparison image corresponding to the columns extracted from the reference image;

summing the extracted columns; and comparing the correlation of the sums of the ectracted columns from the reference image to the sums of the extracted columns from the comparison image.

8. The method of claim 6, wherein comparing the portion of the comparison image to the portion of the reference image, further comprises:

locating a lateral ridge of a predetermined magnetic intensity peak in the portion of the comparison image and the portion of the reference image;

locating predetermined 'mixels' within the lateral ridges; and comparing the located 'mixels' from the reference image with the located 'mixels' from the comparison image.

9. The method of claim 8, wherein comparing the located 'mixels' from the reference image with the located 'mixels' from the comparison image, comprises determining the correlation between the located 'mixels' from the reference image with the located 'mixels' from the comparison image.

10. The method of claim 6, wherein comparing the portion of the comparison image to the portion of the reference image, further comprises:

locating a lateral ridge of a predetermined magnetic intensity peak in the portion of the comparison image;

locating predetermined 'mixels' that are predetermined distances from the located lateral ridge; and comparing the located 'mixels' with 'mixels' from the reference image.

11. The method of claim 6, wherein the comparison image is generated using an array of magnetic reading heads.

12. The method of claim 11, wherein the comparison image is generated using an array of magnetic reading heads, where:

the magnetic reading heads in the array of magnetic reading heads are rectangular with an upper longitudinal edge and a lower longitudinal edge; and the magnetic reading heads in the array of magnetic reading heads are staggered so that the upper longitudinal edge of a first magnetic reading head is aligned with the lower longitudinal edge of a second magnetic reading head.

13. The method of claim 11, wherein the comparison image is generated using an array of magnetic reading heads, where the magnetic reading heads in the array of magnetic reading heads are magnetoresistive magnetic reading heads.

14. The method of claim 13, wherein the comparison image is generated using an array of magnetic reading heads, where:

current is supplied to the magnetic reading heads by a current source; and each of the magnetic reading heads is connected to a multiplexer.

15. The method of claim 14, wherein the comparison image is generated using an array of magnetic readIng heads, where the multiplexer includes an output that is connected to an analog to digital converter.

* * * * *